United States Patent
Kirsch et al.

(10) Patent No.: US 7,344,761 B2
(45) Date of Patent: *Mar. 18, 2008

(54) LIQUID-CRYSTALLINE COMPOUNDS

(75) Inventors: Peer Kirsch, Kanagawa (JP); Eike Poetsch, Muehltal (DE); Alexander Hahn, Gross-Gerau (DE); Werner Binder, Dieburg (DE); Volker Meyer, Gross-Zimmern (DE); Michael Heckmeier, Hemsbach (DE); Georg Luessem, Petershausen (DE); Melanie Klasen-Memmer, Heuchelheim (DE)

(73) Assignee: Merck Patent Gesellaschaft mit Beschrankter Haftung, Darmstadt (DE)

( * ) Notice: Subject to any disclaimer, the term of this patent is extended or adjusted under 35 U.S.C. 154(b) by 196 days.

This patent is subject to a terminal disclaimer.

(21) Appl. No.: 10/558,205

(22) PCT Filed: May 24, 2004

(86) PCT No.: PCT/EP2004/005538

§ 371 (c)(1),
(2), (4) Date: Nov. 25, 2005

(87) PCT Pub. No.: WO2004/106459

PCT Pub. Date: Dec. 9, 2004

(65) Prior Publication Data

US 2007/0034828 A1    Feb. 15, 2007

(30) Foreign Application Priority Data

May 27, 2003  (DE) ............... 103 24 345

(51) Int. Cl.
*C09K 19/34*  (2006.01)
*C07D 319/06*  (2006.01)
*C07D 407/04*  (2006.01)

(52) U.S. Cl. ............... 428/1.1; 252/299.61; 549/370; 549/415

(58) Field of Classification Search ............... 428/1.1; 252/299.61; 549/370, 415

See application file for complete search history.

(56) References Cited

U.S. PATENT DOCUMENTS

| 5,667,721 A | * | 9/1997 | Buchecker et al. | .... 252/299.61 |
| 5,911,912 A | | 6/1999 | Kirsch et al. | |
| 5,997,766 A | | 12/1999 | Kirsch et al. | |
| 7,189,440 B2 | * | 3/2007 | Manabe et al. | ............... 428/1.3 |

FOREIGN PATENT DOCUMENTS

| DE | 195 25 314 A | 1/1997 |
| DE | 198 07 371 A | 8/1999 |

OTHER PUBLICATIONS

Kirsch, P. et al.: "Novel Polar Liquid Crystals With Very Low Birefringence Based on TRNS-1,3-Dioxane Building Blocks" Advanced Materials, VCH Verlagsgesellschaft, Weinheim, DE, vol. 10, No. 8, Jun. 2, 1998, pp. 602-606, XP000766727, ISSN: 0935-9648.

* cited by examiner

*Primary Examiner*—Shean C Wu
(74) *Attorney, Agent, or Firm*—Miller, White, Zelano, Branigan, P.C.

(57) ABSTRACT

The invention relates to liquid-crystalline compounds of the formula (I), where $R^{11}$, $X^{11}$, $L^{11}$, Y and W are as defined in claim 1, and to the use thereof in liquid-crystalline media, to liquid-crystalline media comprising at least one compound of the formula (I) and to electro-optical displays containing a liquid-crystalline medium of this type

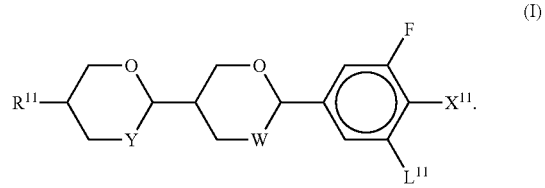

(I)

22 Claims, No Drawings

LIQUID-CRYSTALLINE COMPOUNDS

The present invention relates to liquid-crystalline compounds having at least one tetrahydropyran ring and to the use thereof in a liquid-crystalline medium and to a liquid-crystalline medium comprising the compounds according to the invention, to the use thereof for electro-optical purposes, and to displays containing this medium.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (super-birefringence effect) cells and OMI (optical mode interference) cells. The commonest display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to meet various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, relatively low birefringence, broad nematic phases, very high specific resistance, good UV and temperature stability and low vapour pressure are desired.

Matrix liquid-crystal displays of this type are known. Non-linear elements which can be used for individual switching of the individual pixels are, for example, active elements (i.e. transistors). The term "active matrix" is then used, where a distinction can be made between two types:
1. MOS (metal oxide semiconductor) or other diodes on a silicon wafer as substrate.
2. Thin-film transistors (TFTs) on a glass plate as substrate.

The use of single-crystal silicon as substrate material restricts the display size, since even modular assembly of various part-displays results in problems at the joints.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are back-lit.

The term MLC displays here covers any matrix display with integrated non-linear elements, i.e., besides the active matrix, also displays with passive elements, such as varistors or diodes (MIM=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to an insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. Furthermore, a high value of the voltage holding ratio (VHR)—which represents a measure of the drop in the voltage applied to a display pixel over a time interval—is necessary for good image quality of an MLC display. The MLC displays from the prior art thus do not meet today's requirements.

Thus, there continues to be a great demand for MLC displays having very high specific resistance at the same time as a large working-temperature range, short response times even at low temperatures and low threshold voltage which do not have these disadvantages or only do so to a lesser extent.

In TN (Schadt-Helfrich) cells, media are desired which facilitate the following advantages in the cells:
extended nematic phase range (in particular down to low temperatures)
the ability to switch at extremely low temperatures (outdoor use, automobile, avionics)
increased resistance to UV radiation (longer life)
high $\Delta\epsilon$ for a low threshold voltage $V_{th}$ The media available from the prior art do not allow these advantages to be achieved while simultaneously retaining the other parameters.

In the case of supertwisted (STN) cells, media are desired which facilitate greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

The invention is based on the object of providing media, in particular for MLC, IPS, TN or STN displays, which have improved properties or do not have the above-mentioned disadvantages or do so to a lesser extent, and preferably have high values of the dielectric anisotropy and the voltage holding ratio at the same time as a large nematic phase width.

It has now been found that this object is achieved by the liquid-crystalline compounds according to the invention.

The invention thus relates to liquid-crystalline compounds of the formula I

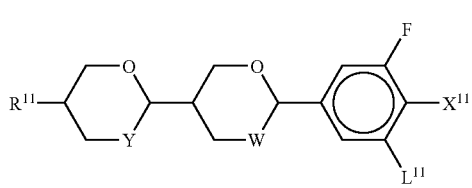

I in which
$R^{11}$ denotes H, an alkyl or alkoxy radical having 1 to 15 carbon atoms or alkenyl or alkenyloxy radical having 2 to 15 carbon atoms, each of which is unsubstituted or mono- or polysubstituted by halogen, where, in addition, one or more $CH_2$ groups in these radicals may each, independently of one another, be replaced by —C≡C—, —CH=CH—,

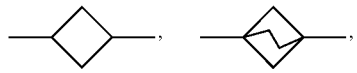

—O—, —CO—, —CO—O— or —O—CO— in such a way that O atoms are not linked directly to one another,
$X^{11}$ denotes F, Cl, CN, NCS, $SF_5$, fluoroalkyl or fluoroalkoxy having 1 to 7 carbon atoms or fluoroalkenyl or fluoroalkenyloxy having 2 to 7 carbon atoms;
$L^{11}$ denotes H or F, and
Y stands for O and W stands for $CH_2$ or Y stands for $CH_2$ and W stands for O or Y and W both stand for $CH_2$.

The invention furthermore relates to the use of the compounds of the formula I in liquid-crystalline media. The invention furthermore relates to a liquid-crystalline medium having at least two liquid-crystalline compounds which is characterised in that it comprises at least one compound of the formula I according to the invention.

The compounds of the formula I have a broad range of applications. Depending on the choice of the substituents, these compounds can serve as base materials of which liquid-crystalline media are predominantly composed; however, it is also possible to add compounds of the formula I to liquid-crystalline base materials from other classes of compound in order, for example, to influence the dielectric and/or optical anisotropy of a dielectric of this type and/or to optimise its threshold voltage and/or its viscosity and/or its clearing point.

In the pure state, the compounds of the formula I are colourless and are suitable for the formation of liquid-crystalline mesophases in a temperature range which is favourably located for electro-optical use. The compounds according to the invention are distinguished by high values of the dielectric anisotropy at the same time as relatively low values of the optical anisotropy and good solubility in nematic mixtures, even at low temperatures. They result in a significant improvement in the low-temperature shelf life. They are stable chemically, thermally and to light.

Preferred compounds of the formula I according to the invention are those in which the substituent $L^{11}$ denotes F.

Compounds of the formula I according to the invention are furthermore those in which $R^{11}$ denotes a straight-chain alkyl or alkenyl radical having up to 7 carbon atoms, i.e. having 1, 2, 3, 4, 5, 6 or 7 (alkyl) or 2, 3, 4, 5, 6 or 7 (alkenyl) carbon atoms. The alkyl or alkenyl radical is particularly preferably unsubstituted. Examples of preferred radicals $R^{11}$ are, inter alia, methyl, ethyl, n-propyl, n-butyl, n-pentyl, n-hexyl, n-heptyl, vinyl, 1E-propenyl, 2-propenyl, 1E-butenyl, 3-butenyl, 1E-pentenyl, 3E-pentenyl, 1E-hexenyl and 1E-heptenyl.

Compounds of the formula I having a branched wing group $R^{11}$ may occasionally be of importance owing to even better solubility in the conventional liquid-crystalline base materials, but in particular as chiral dopants if they are optically active. Smectic compounds of this type are suitable as components of ferroelectric materials. Branched groups of this type generally contain not more than one chain branch. Preferred branched radicals $R^{11}$ are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentyloxy, 3-methylpentyloxy, 2-ethylhexyloxy, 1-methylhexyloxy, 1-methylheptyloxy.

It is furthermore preferred that $X^{11}$ in the compounds of the formula I according to the invention denotes F, Cl, $SF_5$—CN, $OCF_3$ or $OCHF_2$. $X^{11}$ is particularly preferably F, $OCF_3$ or $OCHF_2$, in particular F or $OCF_3$.

The compounds of the formula I according to the invention form three likewise preferred groups, which are represented by the formulae IA, IB and IC:

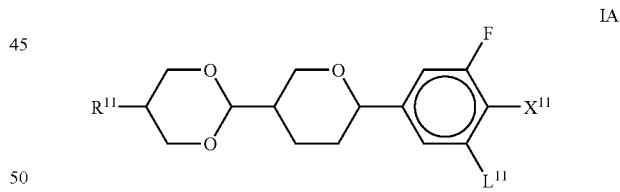

IA

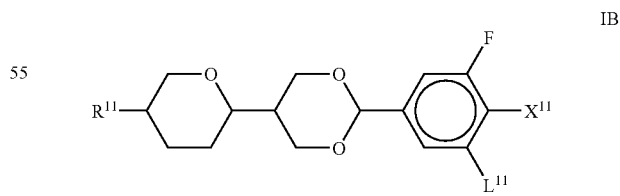

IB

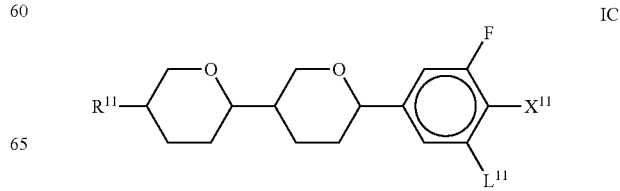

IC

Preferred embodiments of the compounds of the formula I according to the invention or of the sub-formulae IA, IB and IC are selected from compounds of the formulae I1 to I30:
I1
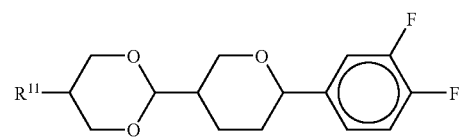
I2
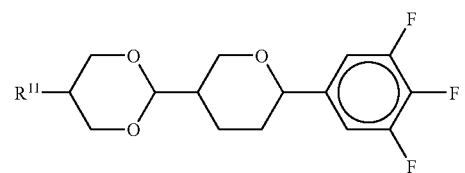
I3
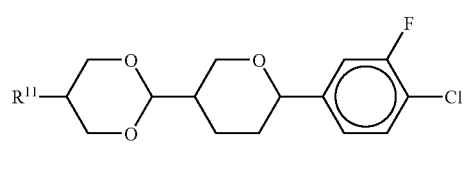
I4
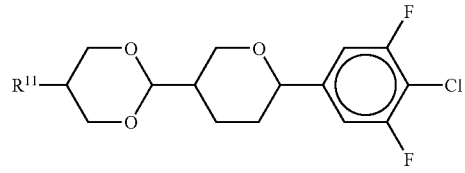
I5
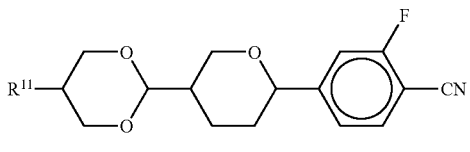
I6
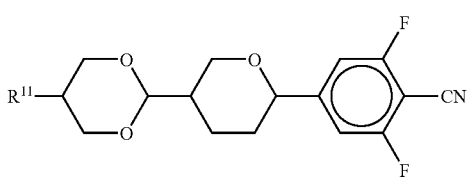
I7
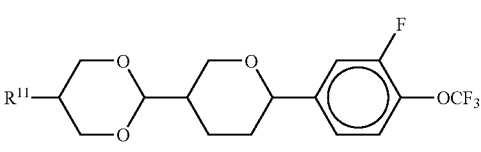
I8
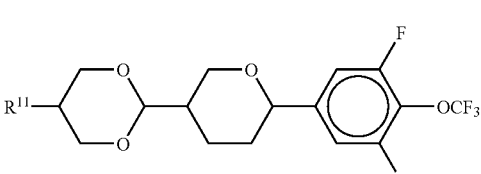
I9
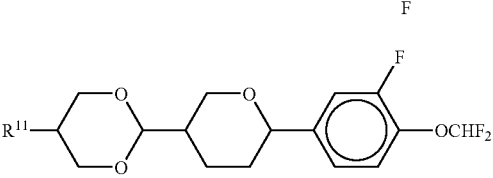
-continued
I10
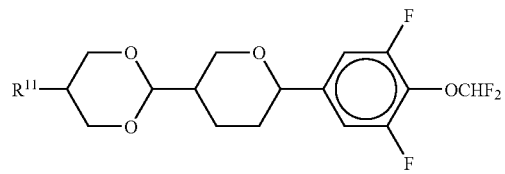
I11
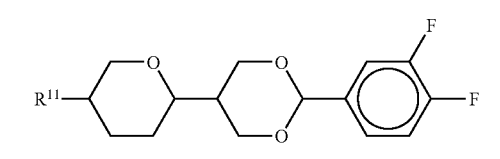
I12
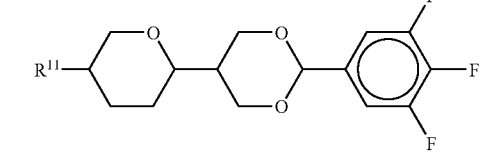
I13
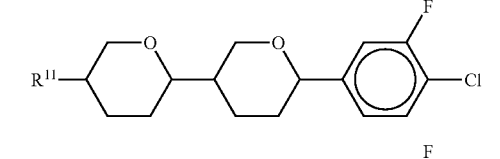
I14
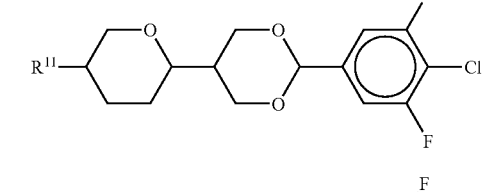
I15
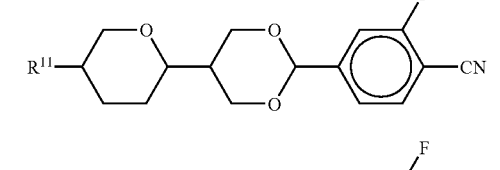
I16
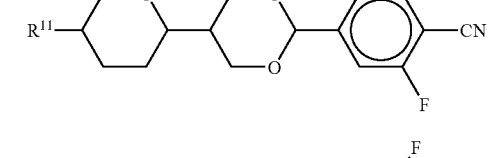
I17
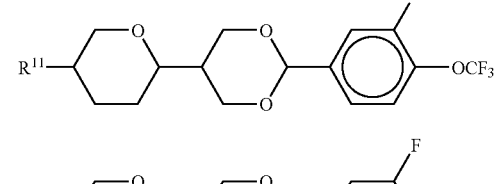
I18
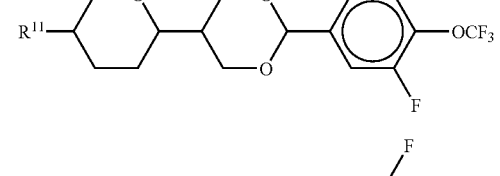
I19
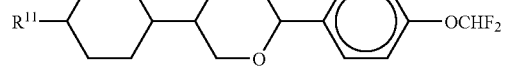

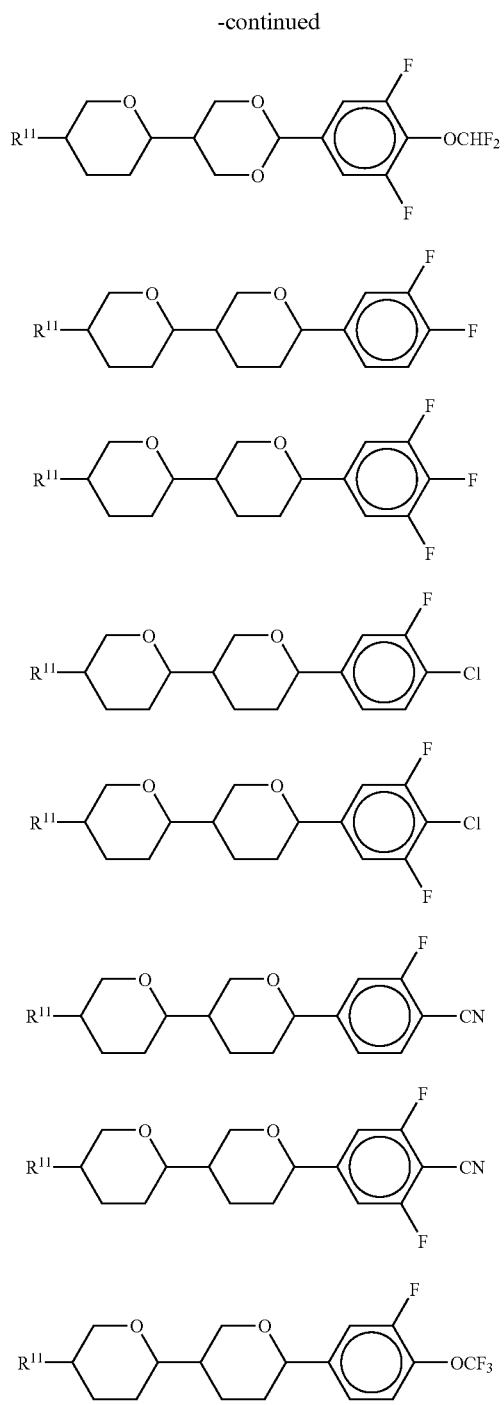

R[11] here has the same meaning as above for the formula I. R[11] preferably stands for a straight-chain alkyl or alkenyl radical having up to 7 carbon atoms, in particular for methyl, ethyl, n-propyl, n-butyl, n-pentyl, n-hexyl, n-heptyl, vinyl, 1E-propenyl, 2-propenyl, 1E-butenyl, 3-butenyl, 1E-pentenyl, 3E-pentenyl, 1E-hexenyl and 1E-heptenyl. Of the preferred compounds of the formulae I1 to I30, particular preference is given to the compounds of the formulae I1, I2, I4, I6, I7, I8, I10, I12, I14, I16, I18, I20, I22, I24, I26, I28 and I30, in particular the compounds of the formulae I1, i2, I8, I12, I18, I22 and I28.

The compounds of the formula I are prepared by methods known per se, as described in the literature (for example in the standard works, such as Houben-Weyl, Methoden der Organischen Chemie [Methods of Organic Chemistry], Georg-Thieme-Verlag, Stuttgart), to be precise under reaction conditions which are known and suitable for the said reactions. Use can also be made here of variants known per se which are not mentioned here in greater detail.

The compounds according to the invention can be prepared, for example, by the following synthesis schemes or analogously thereto. In the final reaction step of scheme 1, the isomerisation of the cis/trans isomer mixture, obtained after hydrogenation, of the tetrahydropyran of the formula AI to the trans isomer is also shown here by way of example.

-continued
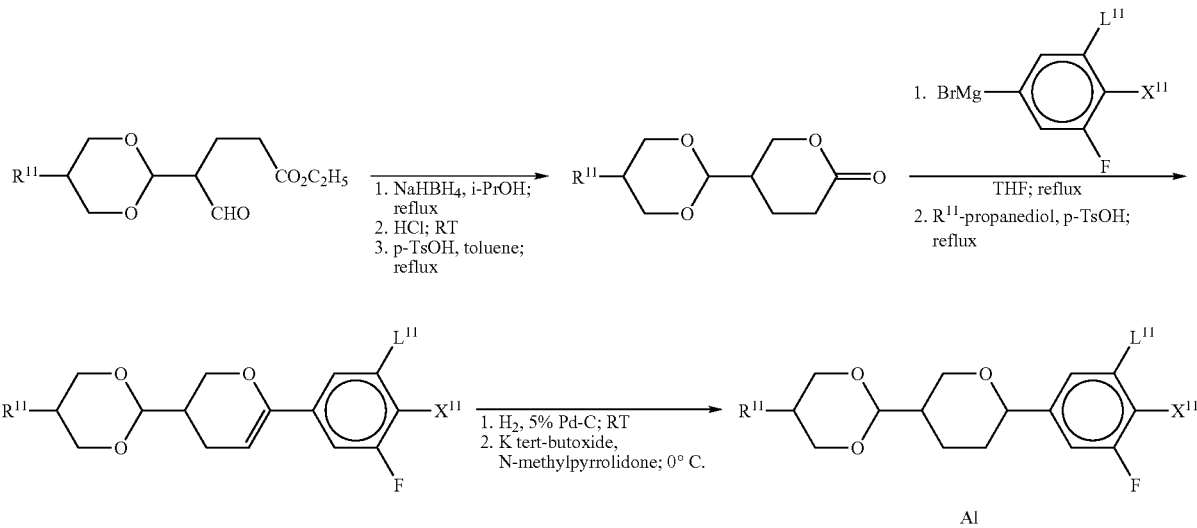
Al
Scheme 2
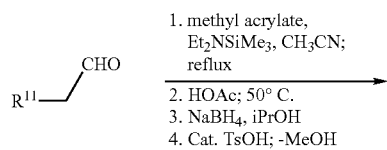
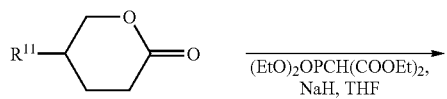
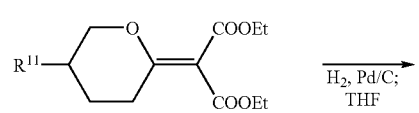
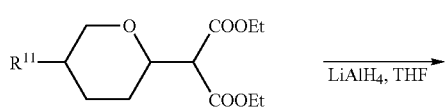
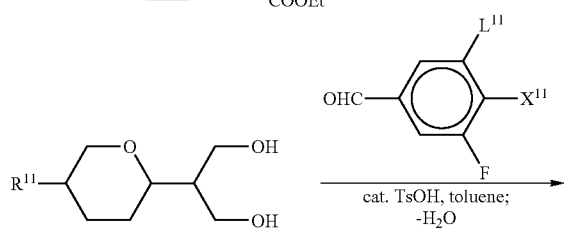
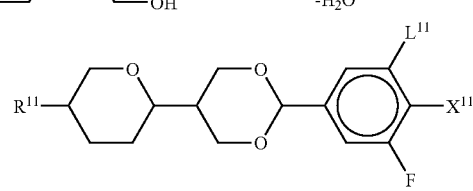
BI
Scheme 3
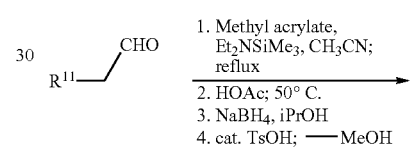
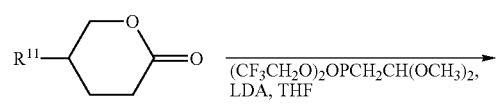
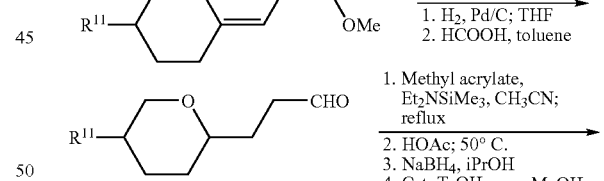
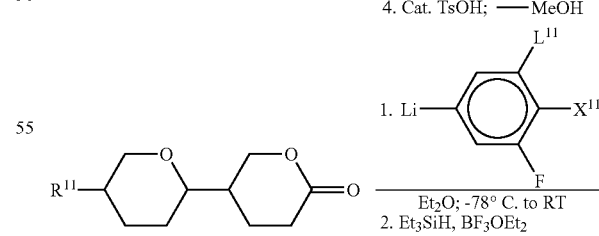
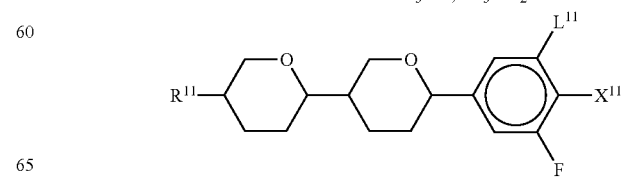
Cl If radicals or substituents of the compounds according to the invention or the compounds according to the invention themselves can be in the form of optically active radicals, substituents or compounds since they have, for example, an asymmetric centre, these are also covered by the present invention. The same applies to compounds of the formula I according to the invention which can be in the form of stereoisomers for other reasons. It goes without saying here that the compounds of the formula I according to the invention can be in (stereo)isomerically pure form, for example as pure enantiomers or diastereomers, or as a mixture of a plurality of isomers, for example as a racemate.

If the compounds of the formula I can be in the form of cis/trans isomers, the trans isomers (or all-trans isomers) are generally preferred. They are accessible either by selective synthesis using methods which are familiar to the person skilled in the art or are obtained from isomer mixtures by isomerisation using bases or acids or with the aid of conventional separation methods, for example crystallisation, distillation or chromatography.

The liquid-crystalline media according to the invention comprise at least one compound of the formula I. They are preferably based on a plurality (preferably two, three or more) of compounds of the formula I, the proportion of these compounds is generally 2-95%, preferably 5-60% and particularly preferably in the range from 5-40%.

The liquid-crystalline media according to the invention preferably comprise 2 to 40, particularly preferably 4 to 30, components as further constituents besides one or more compounds according to the invention. In particular, these media comprise 7 to 25 components besides one or more compounds according to the invention. These further constituents are preferably selected from nematic or nematogenic (monotropic or isotropic) substances, in particular substances from the classes of the azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid or of cyclohexylcyclohexanecarboxylic acid, phenylcyclohexanes, cyclohexylbiphenyls, phenylcyclohexylcyclohexanes, cyclohexylcyclohexanes, cyclohexylcyclohexylcyclohexenes, 1,4-biscyclohexylbenzenes, 4,4'-biscyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, optionally halogenated stilbenes, benzyl phenyl ethers, tolans and substituted cinnamic acids. The 1,4-phenylene groups in these compounds may also be fluorinated.

The most important compounds suitable as further constituents of the media according to the invention can be characterised by the formulae 1, 2, 3, 4 and 5:

| | |
|---|---|
| R'-L-E-R" | 1 |
| R'-L-COO-E-R" | 2 |
| R'-L-OOC-E-R" | 3 |
| R'-L-CH$_2$CH$_2$-E-R" | 4 |
| R'-L-CF$_2$O-E-R" | 5 |

In the formulae 1, 2, 3, 4 and 5, L and E, which may be identical or different, each, independently of one another, denote a divalent radical from the group formed by -Phe-, -Cyc-, -Phe-Phe-, -Phe-Cyc-, -Cyc-Cyc-, -Pyr-, -Dio-, -G-Phe- and -G-Cyc- and their mirror images, where Phe denotes unsubstituted or fluorine-substituted 1,4-phenylene, Cyc denotes trans-1,4-cyclohexylene or 1,4-cyclohexenylene, Pyr denotes pyrimidine-2,5-diyl or pyridine-2,5-diyl, Dio denotes 1,3-dioxane-2,5-diyl and G denotes 2-(trans-1,4-cyclohexyl)ethyl.

One of the radicals L and E is preferably Cyc, Phe or Pyr. E is preferably Cyc, Phe or Phe-Cyc. The media according to the invention preferably comprise one or more components selected from the compounds of the formulae 1, 2, 3, 4 and 5 in which L and E are selected from the group Cyc, Phe and Pyr and simultaneously one or more components selected from the compounds of the formulae 1, 2, 3, 4 and 5 in which one of the radicals L and E is selected from the group Cyc, Phe and Pyr and the other radical is selected from the group -Phe-Phe-, -Phe-Cyc-, -Cyc-Cyc-, -G-Phe- and -G-Cyc-, and optionally one or more components selected from the compounds of the formulae 1, 2, 3, 4 and 5 in which the radicals L and E are selected from the group -Phe-Cyc-, -Cyc-Cyc-, -G-Phe- and -G-Cyc-.

R' and/or R" each, independently of one another, denote alkyl, alkenyl, alkoxy, alkoxyalkyl, alkenyloxy or alkanoyloxy having up to 8 C atoms, —F, —Cl, —CN, —NCS, —(O)$_i$CH$_{3-(k+l)}$F$_k$Cl$_l$, where i is 0 or 1 and k and l are 1, 2 or 3.

In a smaller sub-group of the compounds of the formulae 1, 2, 3, 4 and 5, R' and R" each, independently of one another, denote alkyl, alkenyl, alkoxy, oxaalkyl, alkenyloxy or alkanoyloxy having up to 8 C atoms. This smaller sub-group is called group A below, and the compounds are referred to by the sub-formulae 1a, 2a, 3a, 4a and 5a. In most of these compounds, R' and R" are different from one another, one of these radicals usually being alkyl, alkenyl, alkoxy or alkoxyalkyl.

In another smaller sub-group of the compounds of the formulae 1, 2, 3, 4 and 5, which is known as group B, R" denotes —F, —Cl, —NCS or —(O)$_i$CH$_{3-(k+l)}$F$_k$Cl$_l$, where i is 0 or 1 and k and l are 1, 2 or 3; the compounds in which R" has this meaning are referred to by the sub-formulae 1b, 2b, 3b, 4b and 5b. Particular preference is given to those compounds of the sub-formulae 1b, 2b, 3b, 4b and 5b in which R" has the meaning —F, —Cl, —NCS, —CF$_3$, —OCHF$_2$ or —OCF$_3$.

In the compounds of the sub-formulae 1b, 2b, 3b, 4b and 5b, R' has the meaning indicated for the compounds of the sub-formulae 1a to 5a and is preferably alkyl, alkenyl, alkoxy or alkoxyalkyl.

In a further smaller sub-group of the compounds of the formulae 1, 2, 3, 4 and 5, R" denotes —CN; this sub-group is referred to below as group C, and the compounds of this sub-group are correspondingly described by sub-formulae 1c, 2c, 3c, 4c and 5c. In the compounds of the sub-formulae 1c, 2c, 3c, 4c and 5c, R' has the meaning indicated for the compounds of the sub-formulae 1a to 5a and is preferably alkyl, alkoxy or alkenyl.

Besides the preferred compounds of groups A, B and C, other compounds of the formulae 1, 2, 3, 4 and 5 having other variants of the proposed sub-stituents are also common. All these substances are obtainable by methods which are known from the literature or analogously thereto.

Besides compounds of the formula I according to the invention, the media according to the invention preferably comprise one or more compounds selected from groups A and/or B and/or C. The proportions by weight of the compounds from these groups in the media according to the invention are preferably:
group A: 0 to 90%, preferably 20 to 90%, particularly preferably 30 to 90%;
group B: 0 to 80%, preferably 10 to 80%, particularly preferably 10 to 65%;
group C: 0 to 80%, preferably 5 to 80%, particularly preferably 5 to 50%;
where the sum of the proportions by weight of the group A and/or B and/or C compounds present in the respective media according to the invention is preferably 5 to 90% and particularly preferably 10 to 90%.

The liquid-crystal mixtures according to the invention enable a significant broadening of the available parameter latitude.

The achievable combinations of clearing point, thermal and UV stability and dielectric and optical anisotropy are far superior to previous materials from the prior art.

The requirement for a high clearing point, nematic phase at low temperature and a high $\Delta\epsilon$ has hitherto only been achieved to an inadequate extent. Known mesogenic compounds and liquid-crystal (LC) mixtures comprising them having a corresponding clearing point and comparable viscosity have lower $\Delta\epsilon$ values and thus a higher threshold voltage $V_{th}$. Although other known liquid-crystalline compounds or the LC mixtures comprising them have similarly high $\Delta\epsilon$ values and low threshold voltage values, they are, however, significantly more viscous and/or have significantly lower clearing points. Compared with the (bisdioxanyl)phenyl derivatives known from DE 195 25 314 A1, the compounds of the formula I according to the invention are in turn distinguished, in particular, by the better solubility in nematic LC media, even at low temperatures.

The liquid-crystal mixtures according to the invention, while retaining the nematic phase down to −20° C. and preferably down to −30° C., particularly preferably down to −40° C., enable clearing points above 80°, preferably above 90°, particularly preferably above 100° C., simultaneously dielectric anisotropy values $\Delta\epsilon \geq 4$, preferably $\geq 6$, and a high value for the specific resistance to be achieved, enabling excellent STN and MLC displays to be obtained. In particular, the mixtures are characterised by low operating voltages. The TN thresholds are below 1.5 V, preferably below 1.3 V.

It goes without saying that, through a suitable choice of the components of the mixtures according to the invention, it is also possible for higher clearing points (for example above 110°) to be achieved at higher threshold voltages or lower clearing points to be achieved at lower threshold voltages with retention of the other advantageous properties. At viscosities correspondingly increased only slightly, it is likewise possible to obtain mixtures having greater $\Delta\epsilon$ and thus lower thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (DE 30 22 818 A1), a lower dielectric anisotropy is sufficient at the same threshold voltage as in an analogous display at the second minimum. This enables significantly higher specific resistance values to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

The flow viscosity $v_{20}$ at 20° C. is preferably <60 mm$^2$·s$^{-1}$, particularly preferably <50 mm$^2$·s$^{-1}$. The nematic phase range is preferably at least 90°, in particular at least 100°. This range preferably extends at least from −30° to +80°. The rotational viscosity $\gamma_1$ at 20° C. is preferably <200 mPa·s, particularly preferably <180 mPa·s, in particular <160 mPa·s.

Measurements of the capacity holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I exhibit a significantly smaller decrease in the HR with increasing temperature than analogous mixtures comprising cyanophenylcyclohexanes of the formula

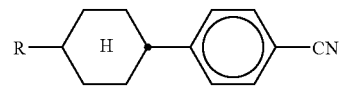

or esters of the formula

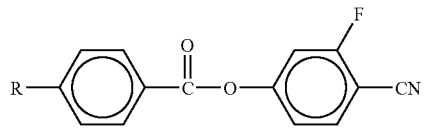

instead of the compounds of the formula I.

The UV stability of the mixtures according to the invention is also considerably better, i.e. they exhibit a significantly smaller decrease in the HR on exposure to UV.

The optimum mixing ratio of the compounds of the formula I and the compounds of groups A, B and C depends substantially on the desired properties, on the choice of the components of groups A, B and/or C and on the choice of any other components present. Suitable mixing ratios within the above-indicated range can easily be determined from case to case.

The liquid-crystal mixtures according to the invention are prepared in a manner conventional per se. In general, the desired amount of the components used in smaller amount is dissolved in the components making up the principal constituent, preferably at elevated temperature. It is also possible to mix solutions of the components in an organic solvent, for example in acetone, chloroform or methanol, and, after thorough mixing, to remove the solvent again, for example by distillation. It is furthermore possible to prepare the mixtures in other conventional ways, for example by using premixes, for example homologue mixtures, or using so-called "multi-bottle" systems.

The medium according to the invention may optionally comprise further additives known to the person skilled in the art and described in the literature, for example stabilisers, chiral dopants or dichroic dyes, in the usual concentrations. The total concentration of these further constituents is in the range from 0% to 15%, preferably in the range from 0.1% to 10% and is in particular not greater than 6%, based on the mixture as a whole. The concentrations of the individual compounds of these are generally in the range from 0.1% to 3%. The concentrations of these additives and similar constituents of the mixture are not taken into account when indicating the concentration ranges of the other mixture constituents.

The invention also relates to electro-optical displays (in particular STN or MLC displays having two plane-parallel outer plates, which, with a frame, form a cell, integrated non-linear elements for switching individual pixels on the outer plates, and a nematic liquid-crystal mixture of positive dielectric anisotropy and high specific resistance located in the cell) which contain media of this type, and to the use of these media for electro-optical purposes.

The construction of the MLC display according to the invention from polarisers, electrode base plates and electrodes having surface treatment corresponds to the usual design for displays of this type. The term usual design here is broadly drawn and also encompasses all derivatives and modifications of the MLC display, in particular also matrix display elements based on poly-Si TFTs or MIM.

An essential difference of the displays according to the invention from the displays conventional hitherto based on the twisted nematic cell consists, however, in the choice of the liquid-crystal parameters of the liquid-crystal layer.

In connection with the present invention, the term "alkyl"—unless defined otherwise elsewhere in this description or in the claims—denotes a straight-chain or branched aliphatic hydrocarbon radical having 1 to 15 (i.e. 1, 2, 3, 4, 5, 6, 7, 8, 9, 10, 11, 12, 13, 14 or 15) carbon atoms. If this alkyl radical is a saturated radical, it is also referred to as "alkanyl". One or more $CH_2$ groups in an alkyl radical may also be replaced by —O— ("oxaalkyl", "alkoxy"), —CH=CH— ("alkenyl"), —C≡C— ("alkynyl"), —CO—, —CO—O— or —O—CO— in such a way that oxygen atoms are not linked directly to one another. Alkyl is preferably a straight-chain radical having 1, 2, 3, 4, 5, 6 or 7 carbon atoms, in particular methyl, ethyl, n-propyl, n-butyl, n-pentyl, n-hexyl, n-heptyl. Groups having 2 to 5 carbon atoms are generally preferred. The alkyl radical may also be mono- or polysubstituted by halogen, in particular fluorine. $CF_3$ and $CHF_2$ are particularly preferred here.

Alkoxy is taken to mean an O-alkyl radical in which the oxygen atom is bonded directly to the group substituted by the alkoxy radical or to the substituted ring, and alkyl is as defined above and is preferably unbranched. Preferred alkoxy radicals are methoxy, ethoxy, propoxy, butoxy, pentoxy, hexoxy, heptoxy and octoxy. Alkoxy is particularly preferably —$OCH_3$, —$OC_2H_5$, —O-n-$C_3H_7$, —O-n-$C_4H_9$ and —O-n-$C_5H_{11}$. The alkoxy radical may also be mono- or polysubstituted by halogen, in particular fluorine. Particularly preferred fluorinated alkoxy radicals are $OCF_3$ and $OCHF_2$.

The term "alkenyl"—unless defined otherwise elsewhere in this description or in the claims—denotes an aliphatic hydrocarbon radical having at least one C=C double bond and encompasses in connection with the present invention straight-chain and branched alkenyl groups having 2 to 15 (i.e. 2, 3, 4, 5, 6, 7, 8, 9, 10, 11, 12, 13, 14 or 15) carbon atoms, in particular the straight-chain groups. The term "alkenyl" also encompasses radicals having 2 or more C=C double bonds. Preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl, and $C_7$-6-alkenyl, in particular $C_2$-$C_7$-1E-alkenyl, $C_4$-$C_7$-3E-alkenyl and $C_5$-$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred. The alkenyl radical may also be mono- or polysubstituted by halogen, in particular fluorine. Particularly preferred fluorinated alkenyl radicals are CH=CHF, CF=CHF and CF=$CF_2$.

An "alkenyloxy" radical is taken to mean an O-alkenyl radical in which the oxygen atom is bonded directly to the group substituted by the alkenyloxy radical or to the substituted ring, and alkenyl is as defined above and is preferably unbranched. The alkenyloxy radical may also be mono- or polysubstituted by halogen, in particular fluorine. Particularly preferred fluorinated alkenyloxy radicals are OCH=CHF, OCF=CHF and OCF=$CF_2$.

Since one or more $CH_2$ groups in an alkyl radical may be replaced in accordance with the invention by —O—, the term "alkyl" also encompasses "oxaalkyl" radicals. In connection with the present invention, the term "oxaalkyl" denotes alkyl radicals in which at least one non-terminal $CH_2$ group has been replaced by —O— in such a way that there are no adjacent oxygen atoms. Oxaalkyl preferably encompasses straight-chain radicals of the formula —$C_aH_{2a+1}$—O—$(CH_2)_b$—, where a and b each, independently of one another, denote 1, 2, 3, 4, 5, 6, 7, 8, 9 or 10, with the proviso that $a+b \leq 14$. Particularly preferably, a is an integer from 1 to 6 and b is 1 or 2.

If one or more $CH_2$ groups in an alkyl radical or alkenyl radical have been replaced by —C≡C—, an alkynyl radical or alkenynyl radical is present. Replacement of one or more $CH_2$ groups by —CO— ("carbonyl"), —CO—O— ("acyloxy") or —O—CO— ("oxycarbonyl") is also possible. The corresponding radical may be straight-chain or branched. It is preferably straight-chain and has 2 to 6 carbon atoms. Accordingly, it particularly preferably denotes acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 3-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl and 4-(methoxycarbonyl)butyl.

If one $CH_2$ group in an alkyl radical has been replaced by unsubstituted or substituted —CH=CH— and an adjacent $CH_2$ group has been replaced by CO or —CO—O or —O—CO—, this radical may be straight-chain or branched. It is preferably straight-chain and has 4 to 13 carbon atoms. Accordingly, it particularly preferably denotes acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl and 9-methacryloyloxynonyl.

The term "fluoroalkyl" preferably encompasses straight-chain alkyl groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine and polysubstitution are not excluded. Fluoroalkyl particularly preferably stands for $CF_3$.

The term "fluoroalkoxy" correspondingly stands for an O-fluoroalkyl radical. Fluoroalkoxy particularly preferably stands for $OCF_3$ and $OCHF_2$.

The term "fluoroalkenyl" denotes, preferably unbranched, alkenyl radicals having fluorine substituents, for example $CH=CHF$, $CF=CHF$ and $CF=CF_2$. The term "fluoroalkenyloxy" correspondingly stands for an O-fluoroalkenyl radical.

The term "halogen" stands for fluorine, chlorine, bromine or iodine, while a "halogenated" radical is taken to mean a radical which is mono- or polysubstituted by fluorine, chlorine, bromine and/or iodine, in particular by fluorine.

C denotes a crystalline phase, S a smectic phase, $S_C$ a smectic C phase, $S_B$ a smectic B phase, $S_A$ a smectic A phase, N a nematic phase and I the isotropic phase.

$V_{10}$ denotes the voltage for 10% transmission (viewing angle perpendicular to the plate surface). $t_{on}$ denotes the switch-on time and $t_{off}$ the switch-off time at an operating voltage corresponding to twice the value of $V_{10}$. $\Delta n$ denotes the optical anisotropy ($\Delta n = n_e - n_o$)] and $n_o$ or $n_e$ the refractive index. $\Delta\epsilon$ denotes the dielectric anisotropy ($\Delta\epsilon = \epsilon_\| - \epsilon_\perp$, where $\epsilon_\|$ denotes the dielectric constant parallel to the longitudinal axes of the molecules and $\epsilon_\perp$ denotes the dielectric constant perpendicular thereto). The electro-optical data were measured in a TN cell at the 1st minimum (i.e. at a d·$\Delta n$ value of 0.5) at 20° C., unless expressly stated otherwise. The optical data were measured at 20° C., unless expressly stated otherwise. $\gamma_1$ denotes the rotational viscosity in mPa·s at 20° C.

For the experimental determination of the physical parameters, the procedure as described in "Licristal, Physical Properties Of Liquid Crystals, Description of the measurement methods", ed. W. Becker, Merck KGaA, Darmstadt, revised edition, 1998, was carried out, where the properties of individual compounds were partly determined after measurement of a defined amount of the compound (usually 5 or 10% by weight) in a defined host mixture having known properties followed by extrapolation.

In the present application and in the following examples, the structures of the liquid-crystal compounds are indicated by means of acronyms, with the transformation into chemical formulae taking place in accordance with Tables A and B below. All radicals $C_nH_{2n+1}$ and $C_mH_{2m+1}$ are straight-chain alkyl radicals having n and m C atoms respectively. n and m each, independently of one another, 1 denote, 2, 3, 4, 5, 6, 7, 8, 9, 10, 11, 12, 13, 14 or 15. The coding in Table B is self-evident. In Table A, only the acronym for the parent structure is indicated. In individual cases this is followed, separated from the acronym for the parent structure by a dash, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nF.F.F | $C_nH_{2n+1}$ | F | F | F |
| nCF$_3$ | $C_nH_{2n+1}$ | CF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |

-continued

| Code for $R^1$, $R^2$, $L^1$, $L^2$ | $R^1$ | $R^2$ | $L^1$ | $L^2$ |
|---|---|---|---|---|
| nS | $C_nH_{2n+1}$ | NCS | H | H |
| rVsN | $C_rH_{2r+1}$—CH=CH—$C_sH_{2s}$— | CN | H | H |
| rEsN | $C_rH_{2r+1}$—O—$C_2H_{2s}$— | CN | H | H |
| nAm | $C_nH_{2n+1}$ | $COOC_mH_{2m+1}$ | H | H |
| nOCCF$_2$.F.F | $C_nH_{2n+1}$ | $OCH_2CF_2H$ | F | F |

Preferred mixture components are shown in Tables A and B.

TABLE A

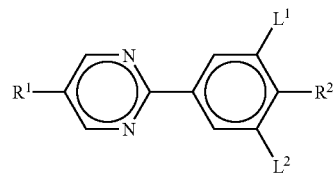

PYP

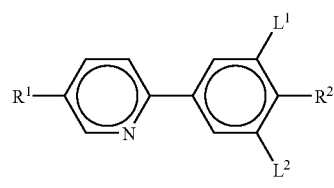

PYRP

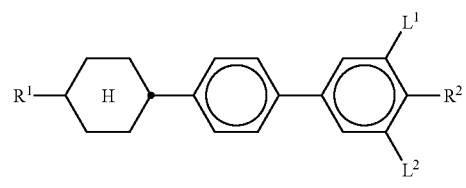

BCH

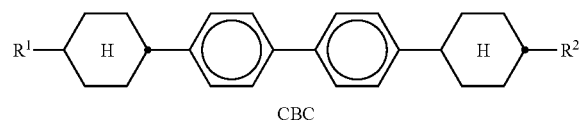

CBC

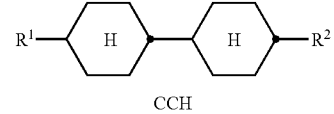

CCH

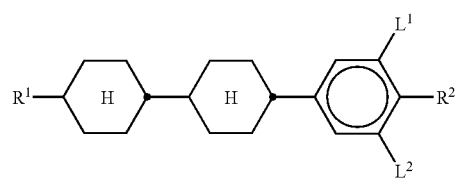

CCP

TABLE A-continued
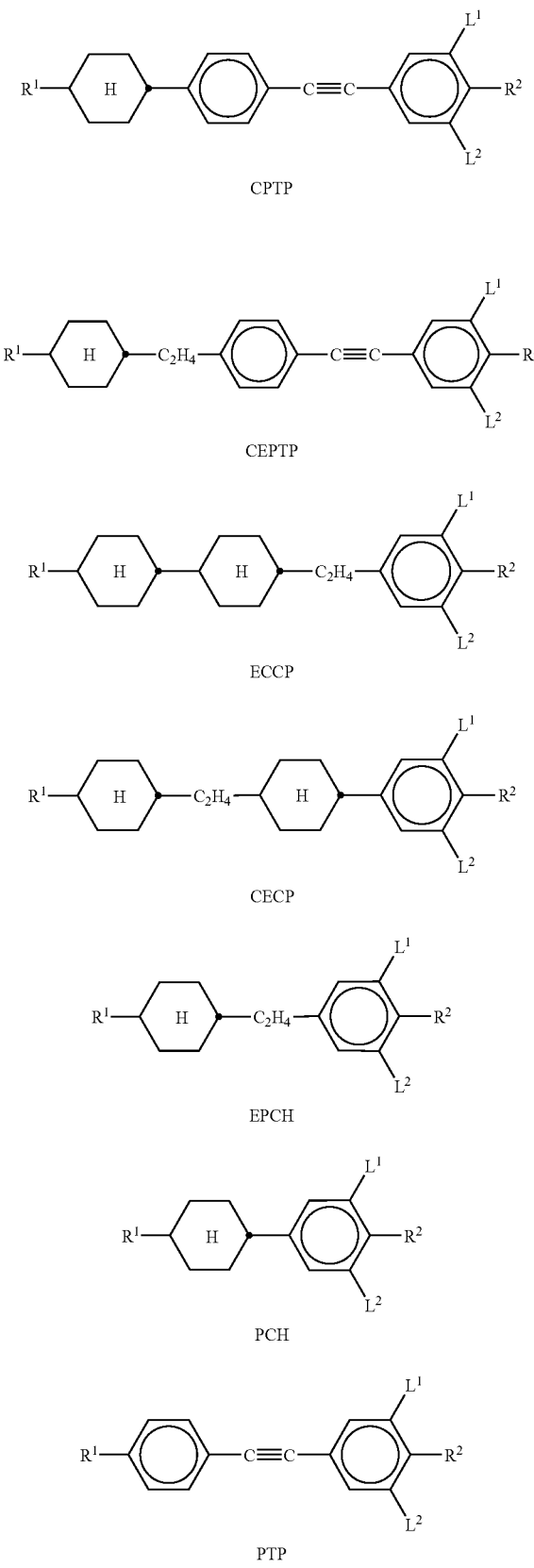
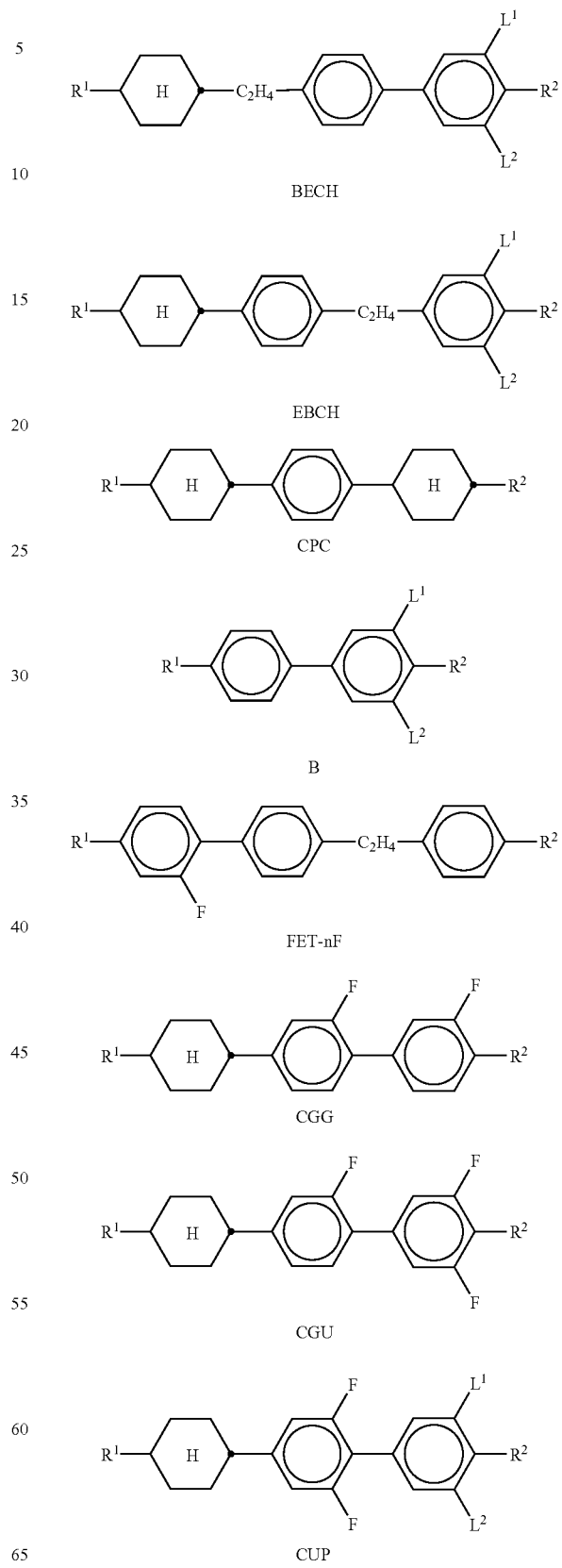

TABLE A-continued
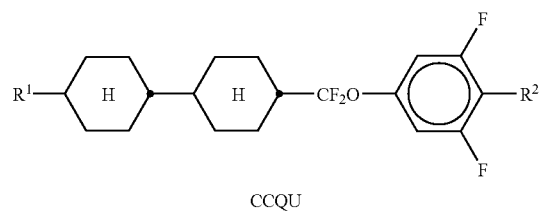
CCQU
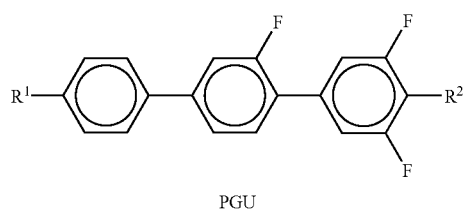
PGU
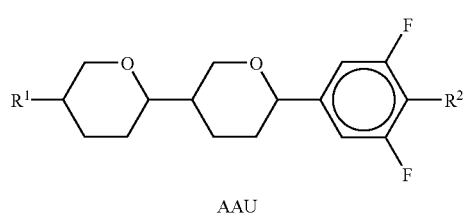
AAU
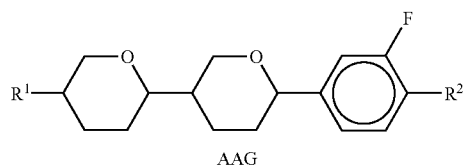
AAG
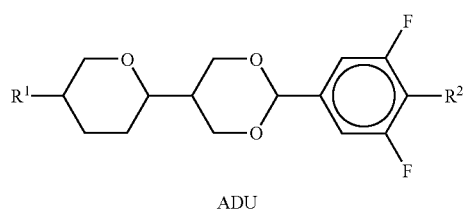
ADU
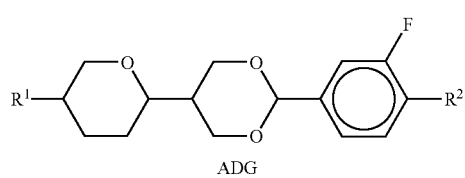
ADG
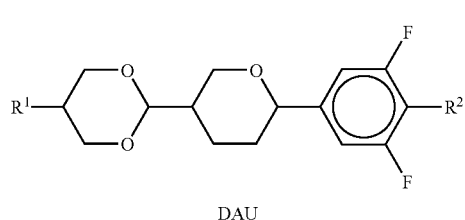
DAU
TABLE A-continued
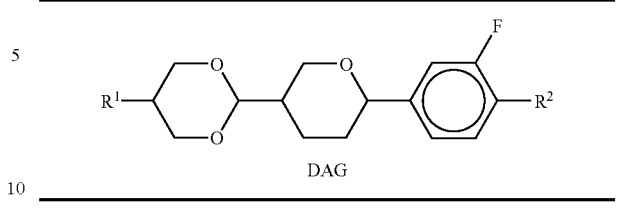
DAG
TABLE B
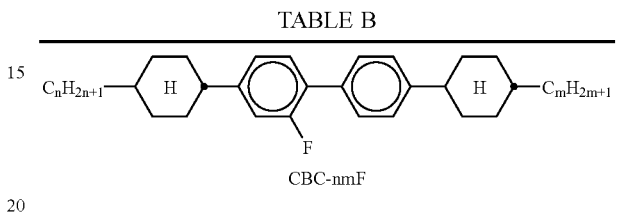
CBC-nmF
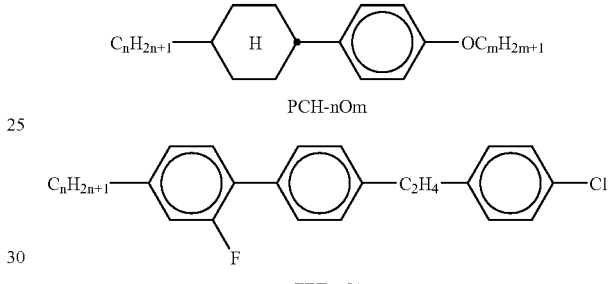
PCH-nOm
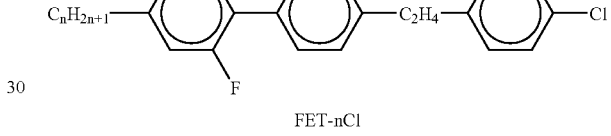
FET-nCl
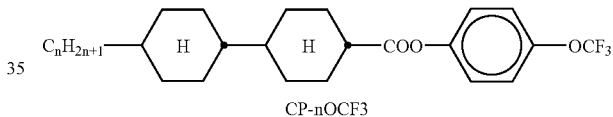
CP-nOCF3
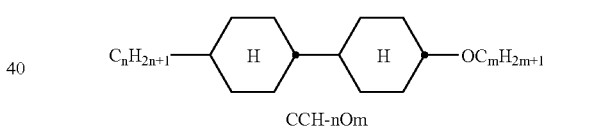
CCH-nOm
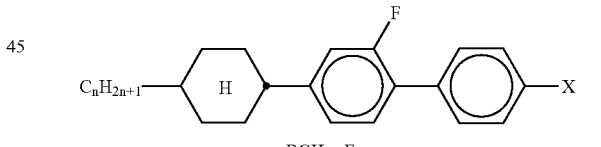
BCH-n.Fm
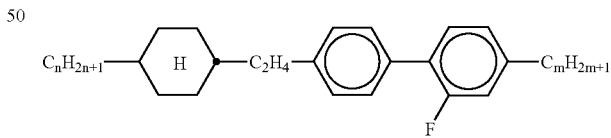
Inm
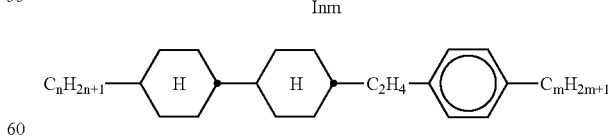
ECCP-nm
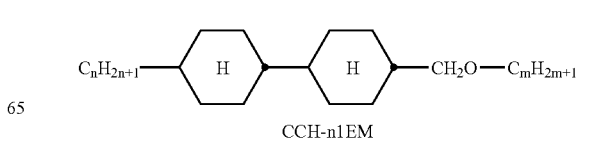
CCH-n1EM TABLE B-continued
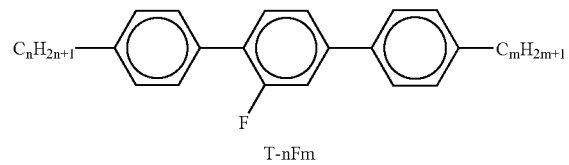
T-nFm
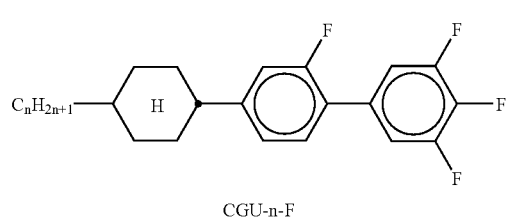
CGU-n-F
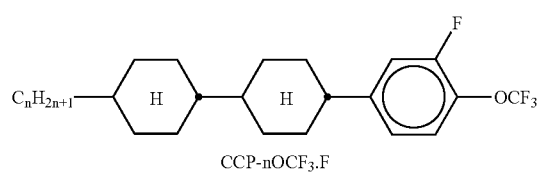
CCP-nOCF3.F
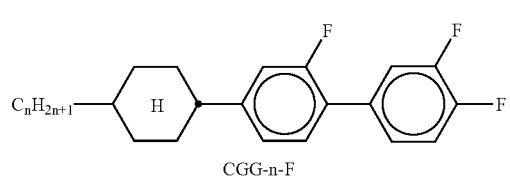
CGG-n-F
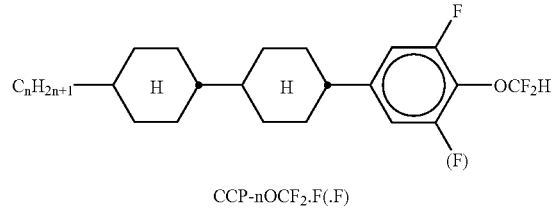
CCP-nOCF2.F(.F)
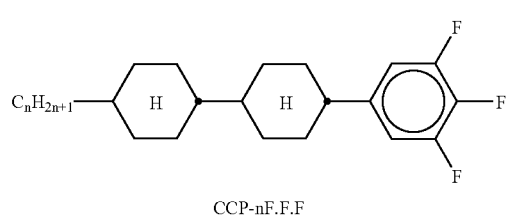
CCP-nF.F.F
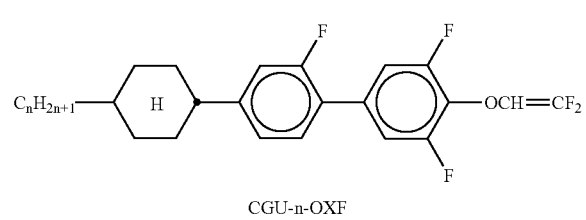
CGU-n-OXF
TABLE B-continued
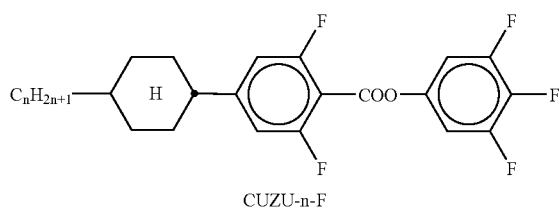
CUZU-n-F
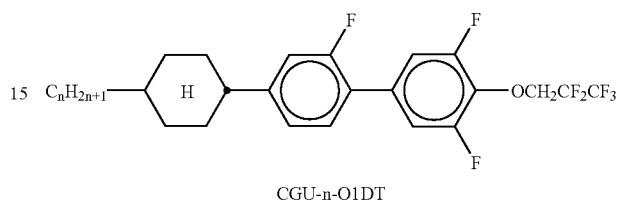
CGU-n-O1DT
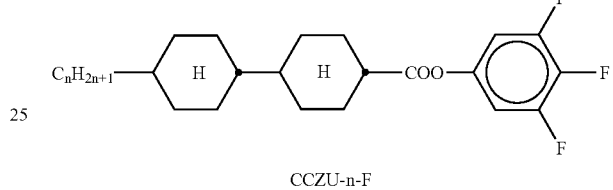
CCZU-n-F
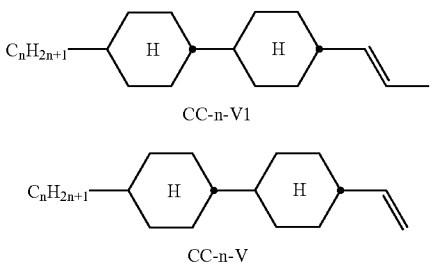
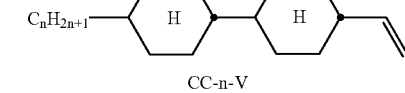
CC-n-V1
CC-n-V
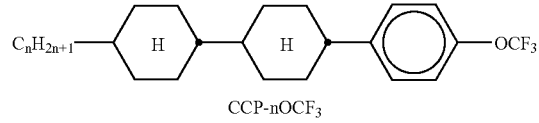
CCP-nOCF3
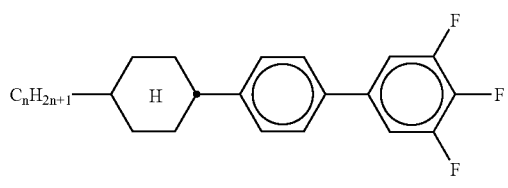
BCH-nF.F.F
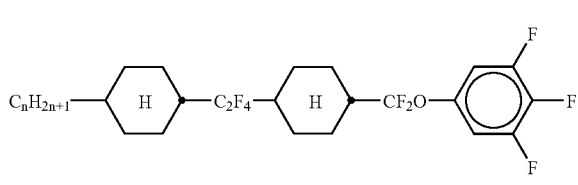
CWCQU-n-F
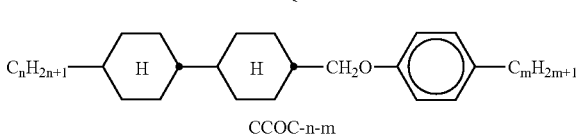
CCOC-n-m TABLE B-continued
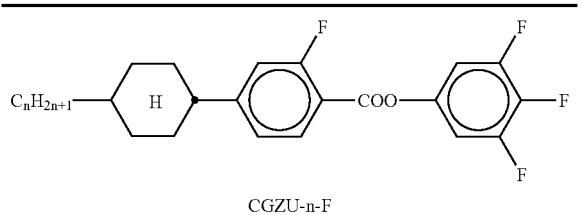
CGZU-n-F
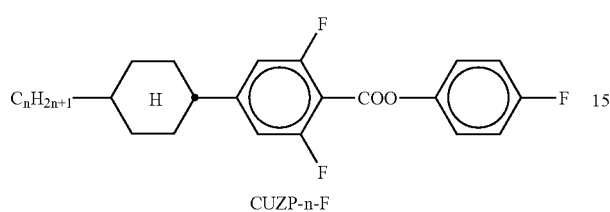
CUZP-n-F
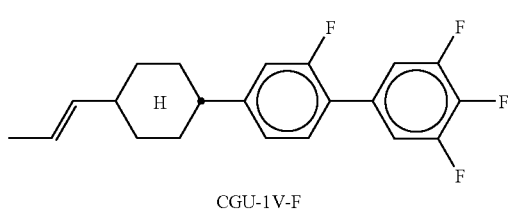
CGU-1V-F
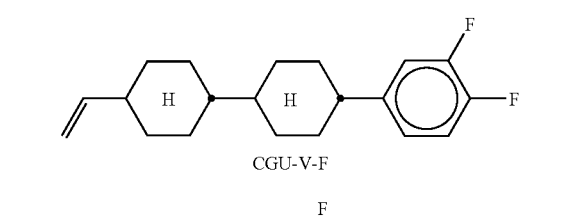
CGU-V-F
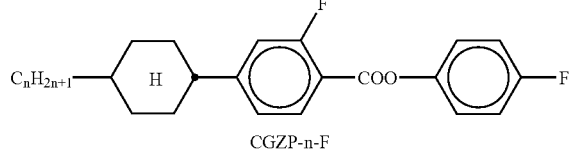
CGZP-n-F
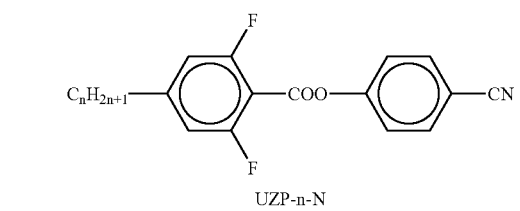
UZP-n-N
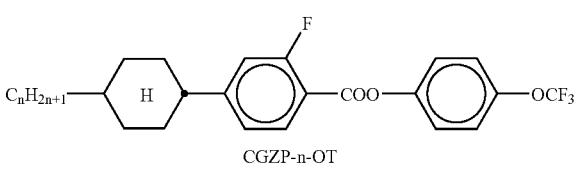
CGZP-n-OT
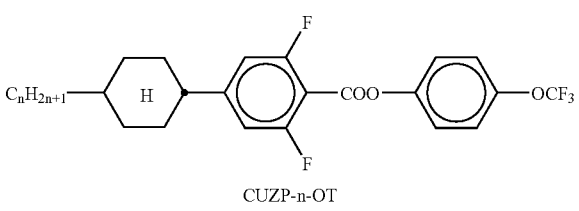
CUZP-n-OT
TABLE B-continued
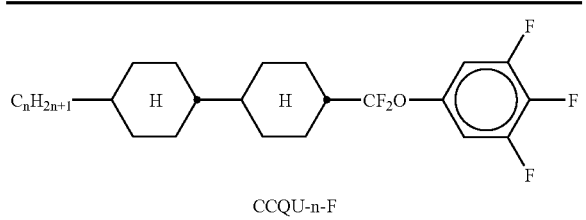
CCQU-n-F
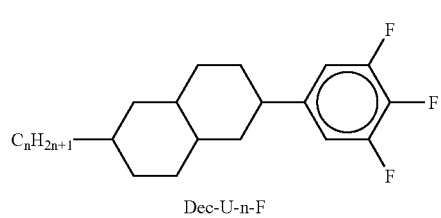
Dec-U-n-F
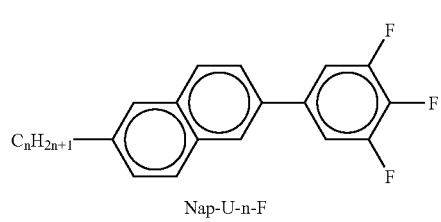
Nap-U-n-F
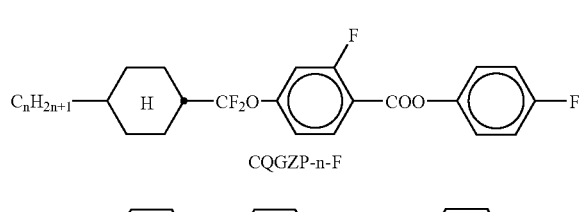
CQGZP-n-F
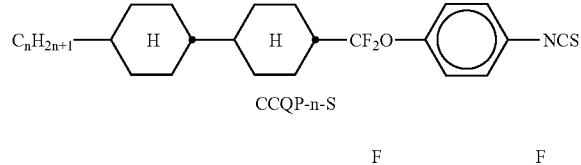
CCQP-n-S
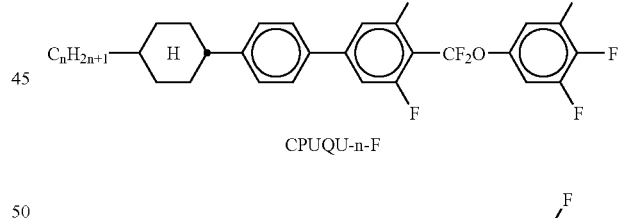
CPUQU-n-F
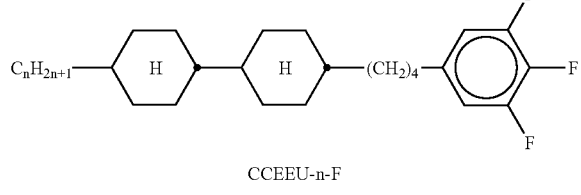
CCEEU-n-F
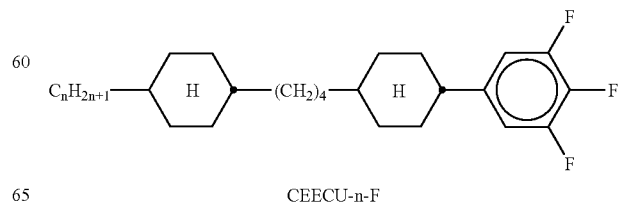
CEECU-n-F

TABLE B-continued
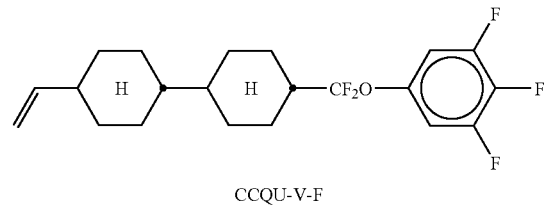
CCQU-V-F
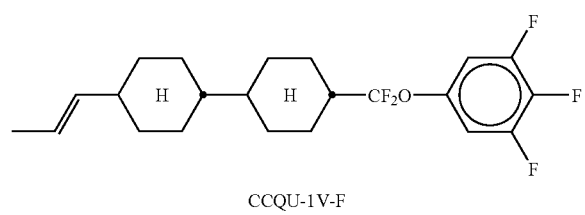
CCQU-1V-F
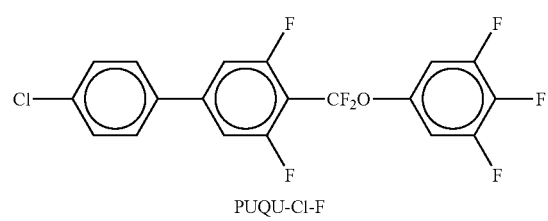
PUQU-Cl-F
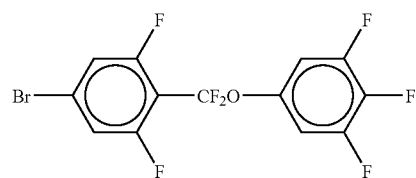
PQU-Br-F
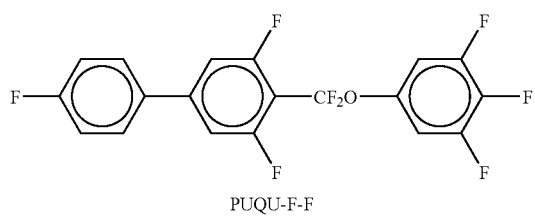
PUQU-F-F
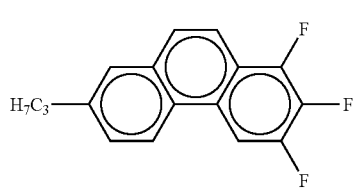
IS-9003
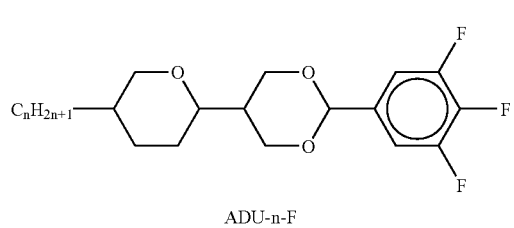
ADU-n-F
TABLE B-continued
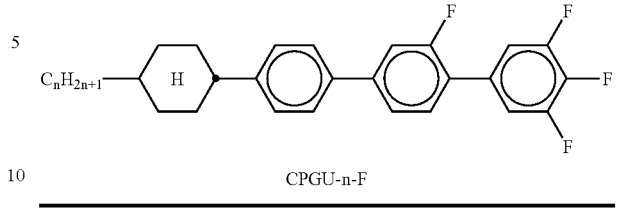
CPGU-n-F
TABLE C
Table C shows possible dopants which are generally added to the mixtures according to the invention, for example in amounts of 0.05-10% by weight.
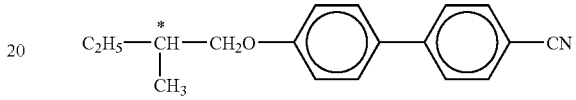
C 15
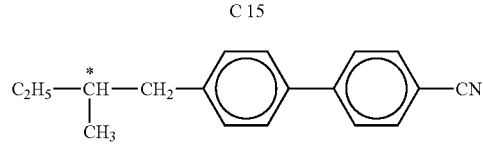
CB 15
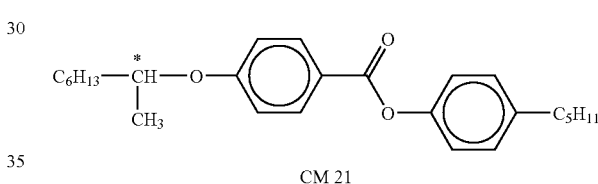
CM 21
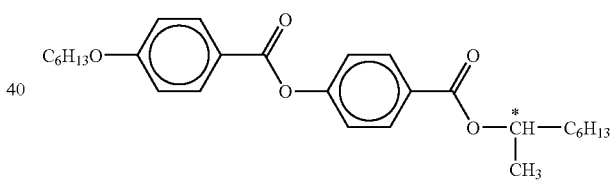
R/S-811
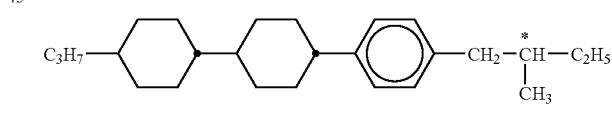
CM 44
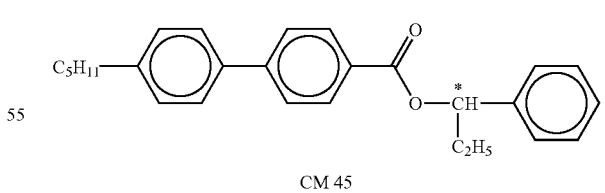
CM 45
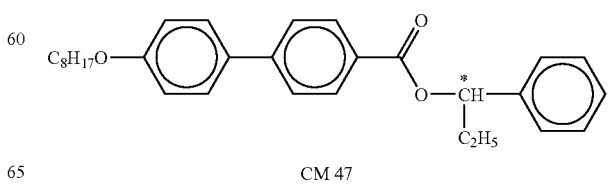
CM 47

TABLE C-continued
Table C shows possible dopants which are generally added to the mixtures according to the invention, for example in amounts of 0.05-10% by weight.
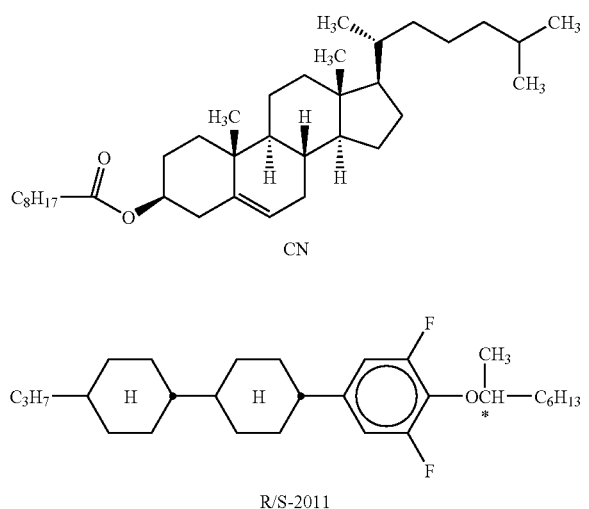
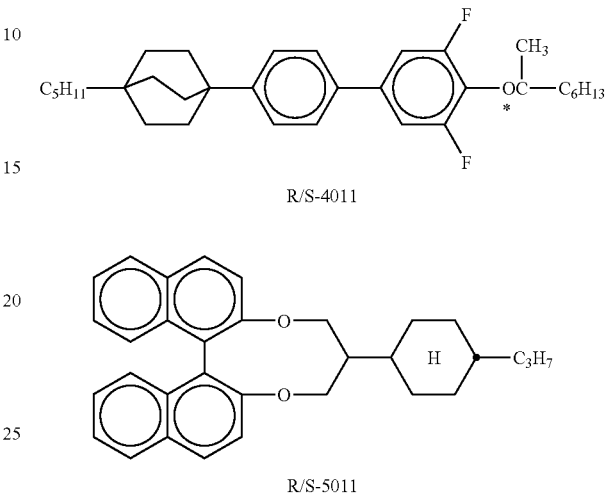
TABLE D
Stabilisers which can be added, for example, to the mixtures according to the invention, for example in amounts of 0.01-10% by weight, are mentioned below.
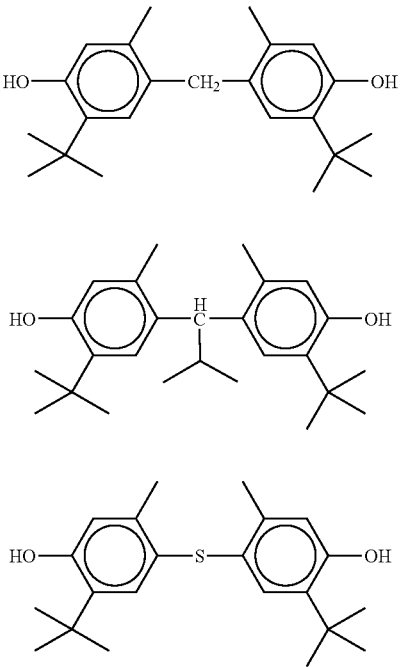

TABLE D-continued
Stabilisers which can be added, for example, to the mixtures according to the invention, for example in amounts of 0.01-10% by weight, are mentioned below.
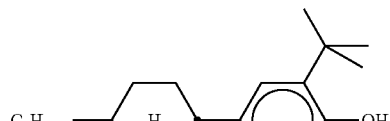
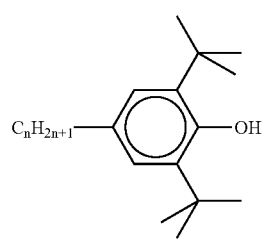
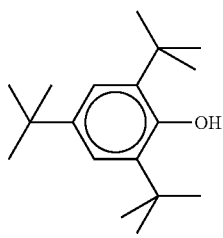
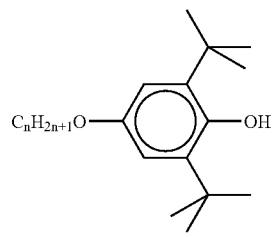
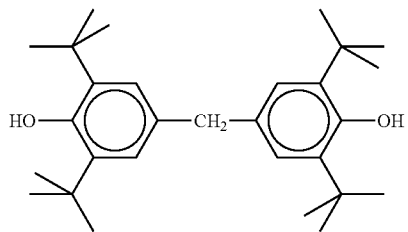
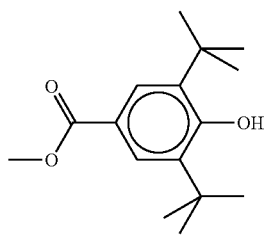

TABLE D-continued
Stabilisers which can be added, for example, to the mixtures according to the invention, for example in amounts of 0.01-10% by weight, are mentioned below.
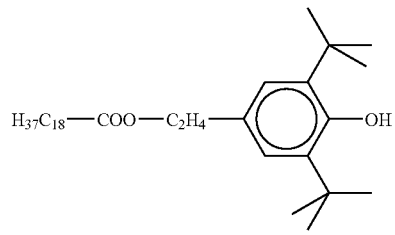
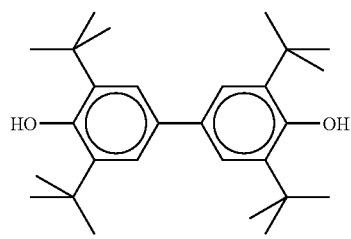
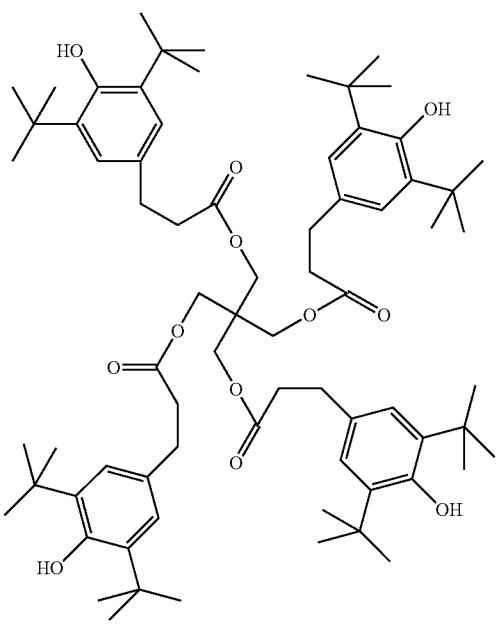
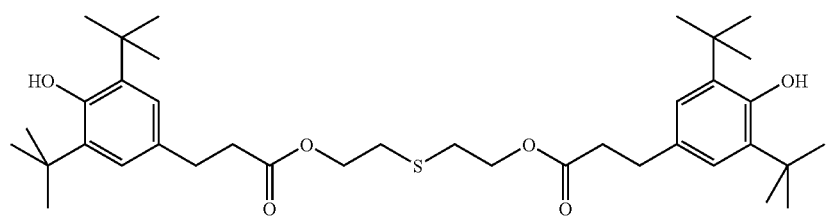

TABLE D-continued
Stabilisers which can be added, for example, to the mixtures according to the invention, for example in amounts of 0.01-10% by weight, are mentioned below.
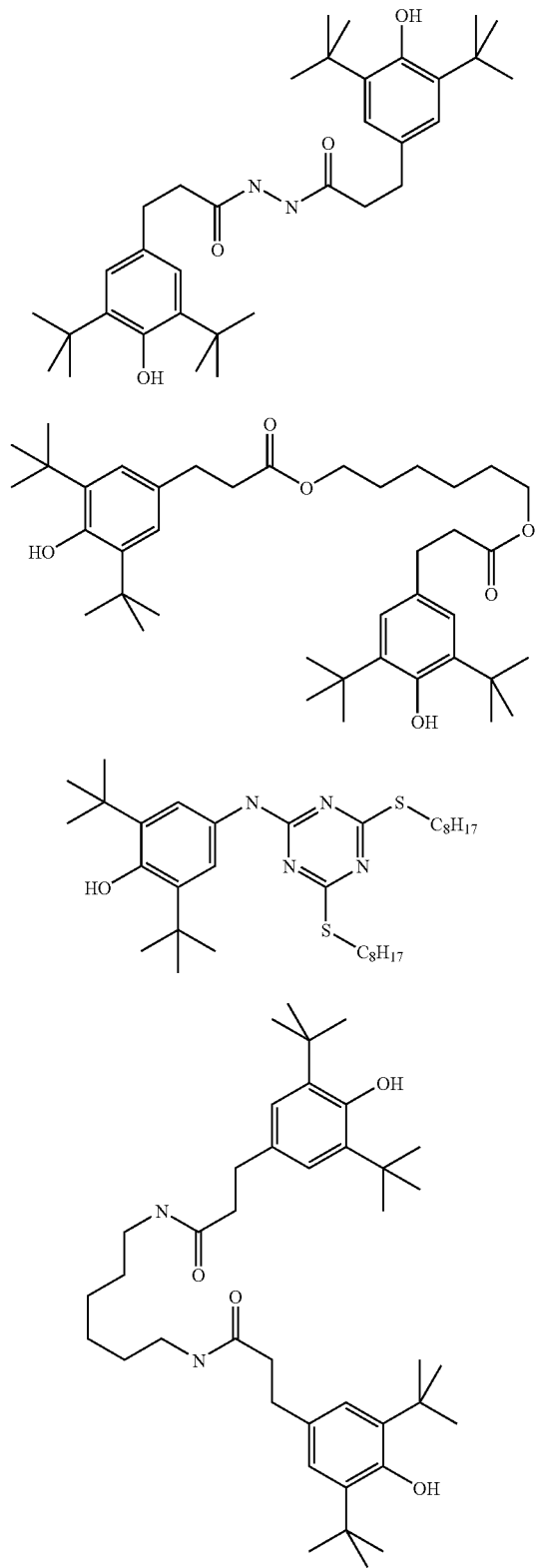

TABLE D-continued
Stabilisers which can be added, for example, to the mixtures according to the invention, for example in amounts of 0.01-10% by weight, are mentioned below.
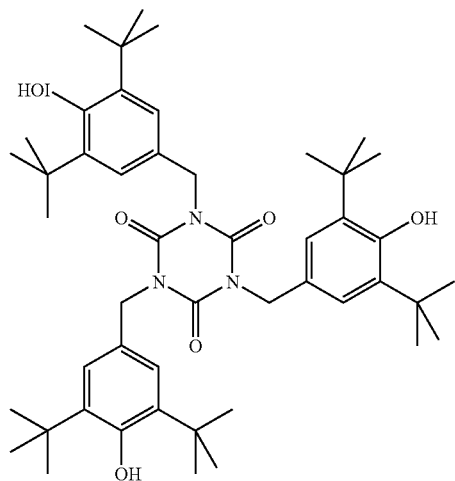
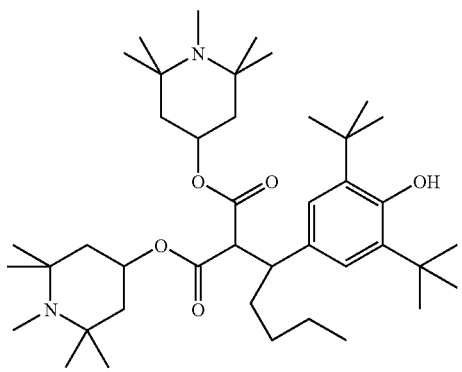
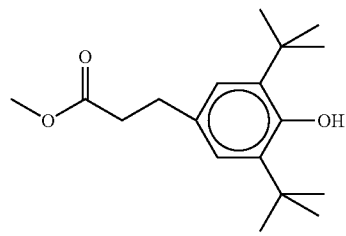
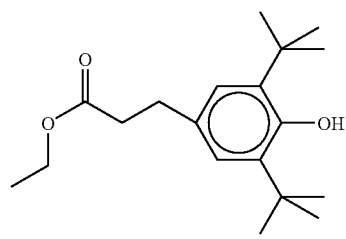

TABLE D-continued
Stabilisers which can be added, for example, to the mixtures according to the invention, for example in amounts of 0.01-10% by weight, are mentioned below.
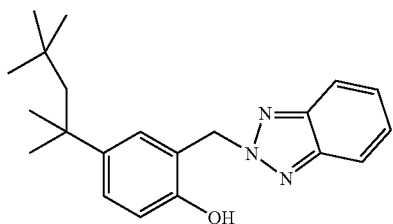
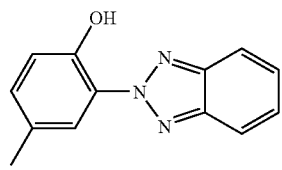
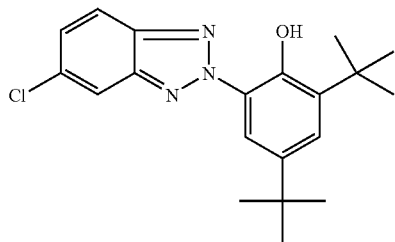
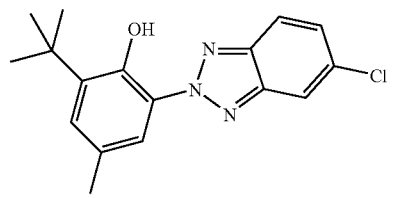
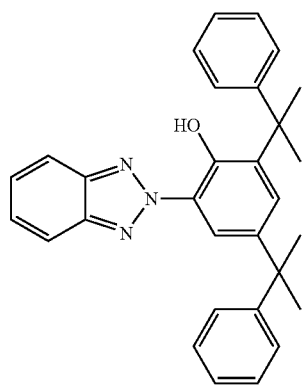

TABLE D-continued
Stabilisers which can be added, for example, to the mixtures according to the invention, for example in amounts of 0.01-10% by weight, are mentioned below.
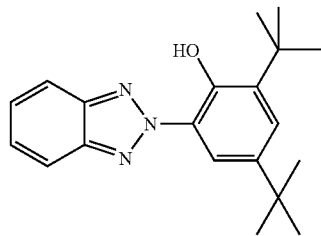
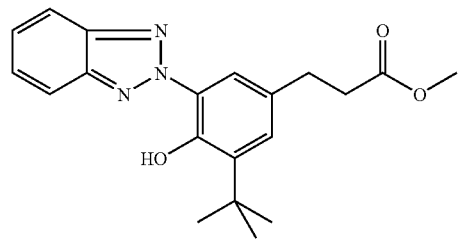
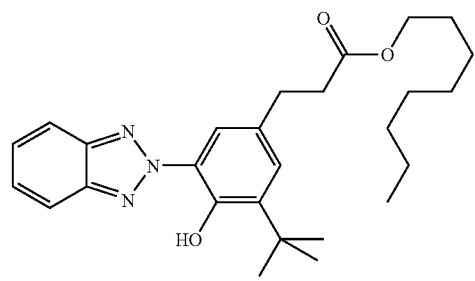
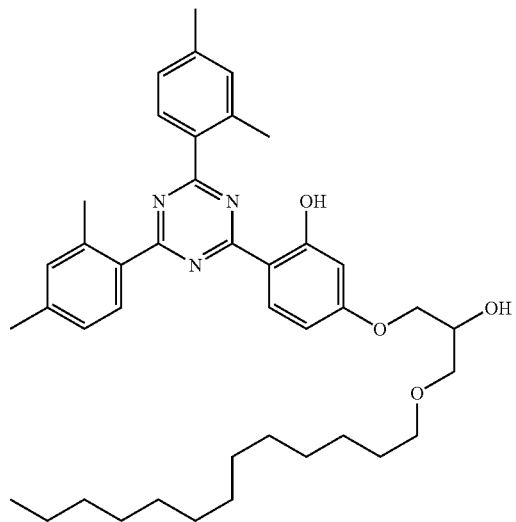

TABLE D-continued
Stabilisers which can be added, for example, to the mixtures according to the invention, for example in amounts of 0.01-10% by weight, are mentioned below.
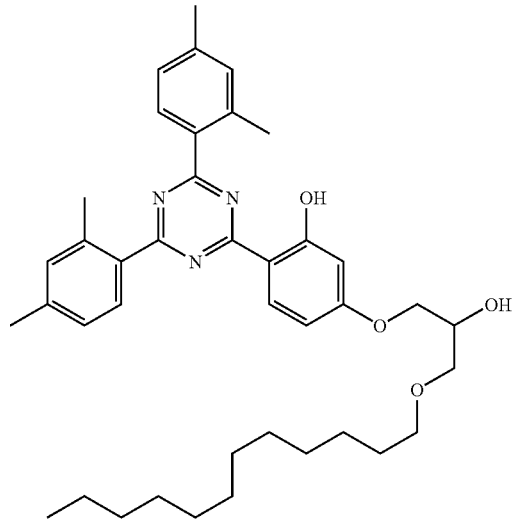
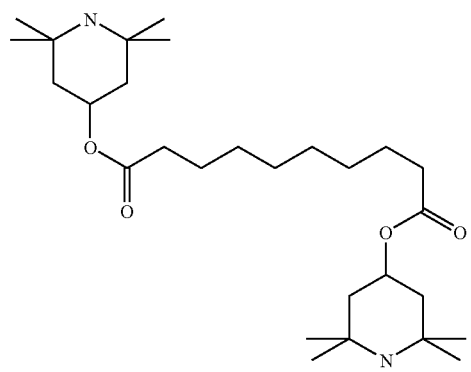
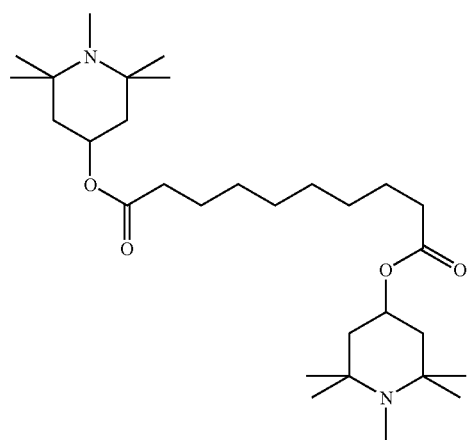
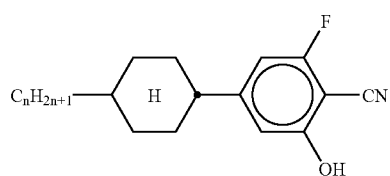

The following examples are intended to explain the invention without limiting it. Above and below, percentages denote per cent by weight. All temperatures are indicated in degrees Celsius. m.p. denotes melting point, cl.p. denotes clearing point. Furthermore, C=crystalline state, N=nematic phase, S=smectic phase and I=isotropic phase. The data between these symbols represent the transition temperatures in ° C. Δn denotes optical anisotropy (589 nm, 20° C.), Δε the dielectric anisotropy 1 kHz, 20° C.). The flow viscosity $v_{20}$ (mm²/sec) was determined at 20° C. The rotational viscosity $\gamma_1$ (mPa·s) was likewise determined at 20° C.

"Conventional work-up" means: water is added to the reaction mixture if necessary, the mixture is extracted with dichloromethane, diethyl ether, methyl tert-butyl ether or toluene, the phases are separated, the organic phase is dried and evaporated, and the product is purified by distillation under reduced pressure or crystallisation and/or chromatography. The following abbreviations are used in the examples and in the synthesis and reaction schemes:

| | |
|---|---|
| n-BuLi | 1.6 molar solution of n-butyllithium in n-hexane |
| DMAP | 4-(dimethylamino)pyridine |
| THF | tetrahydrofuran |
| DCC | N,N'-dicyclohexylcarbodiimide |
| LDA | lithium dimethylamide |
| Me | methyl |
| Et | ethyl |
| iPr | 2-propyl |
| Ph | phenyl |
| Ac | acetyl |
| TsOH | toluenesulfonic acid |
| Pd/C | palladium on carbon |
| RT | room temperature |

EXAMPLE 1

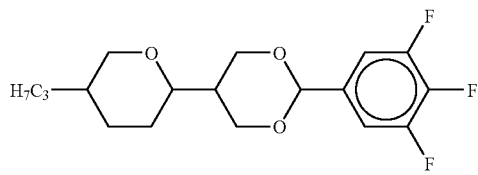

Step 1.1

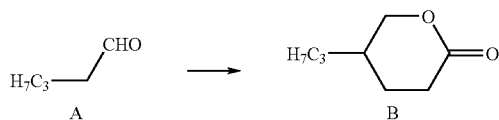

The preparation of B is carried out analogously to the lit. a) R. Baker, A. L. Boyes, C. J. Swain, *J. Chem. Soc. Perkin Trans. 1*, 1990, 1415-1421; b) H. Hagiwara, T. Okabe, H. Ono, V. P. Kamat. T. Hoshi, T. Suzuku, M. Ando, *J. Chem. Soc. Perkin Trans. 1*, 2002, 895-900.

Step 1.2

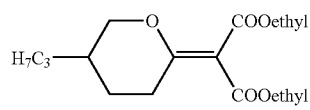

271 mmol of NaH are added in portions at 0° C. to a solution of 271 mmol of (ethylO)₂OPCH(COOethyl)₂ in 800 ml of THF. When the evolution of gas is complete, 271 mmol of B are added. The mixture is stirred at 35° C. for 18 h. The mixture is subjected to aqueous work-up, and the crude product is purified by vacuum distillation. Colourless oil.

Step 1.3

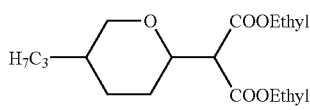

180 mmol of C are dissolved in 500 ml of THF and hydrogenated in the presence of 3 g of 5% Pd/C until the uptake of hydrogen is complete. The mixture is filtered and evaporated. The crude product is employed in the subsequent step without further purification.

Step 1.4

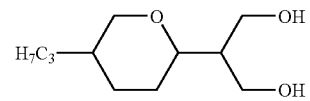

180 mmol of D are dissolved in 300 ml of THF and added dropwise at room temperature to a suspension of 200 ml of LiAlH₄ in 300 ml of THF. The mixture is heated at the boil for 2 h and then subjected to conventional work-up. The product is recrystallised twice at −20° C.

Step 1.5

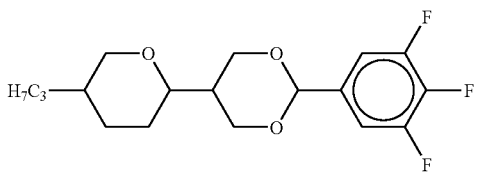

A mixture of 50 mmol of E, 50 mmol of 3,4,5-trifluorobenzaldehyde, 5 mmol of toluenesulfonic acid and 300 mmol of toluene is heated under reflux on a water separator until the elimination of water is complete. The mixture is subjected to aqueous work-up, and the product is purified by chromatography and subsequent crystallisation from heptane.

The following compounds of the formula

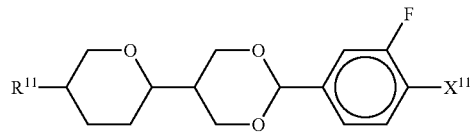

are prepared analogously to F (ADU-3-F; Example 1):

| Example | $R^{11}$ | $X^{11}$ | $L^{11}$ |
|---|---|---|---|
| 2 | H | F | H |
| 3 | $CH_3$ | F | H |
| 4 | $C_2H_5$ | F | H |
| 5 | n-$C_3H_7$ | F | H |
| 6 | n-$C_4H_9$ | F | H |
| 7 | n-$C_5H_{11}$ | F | H |
| 8 | n-$C_6H_{13}$ | F | H |
| 9 | $CH_2$=CH | F | H |
| 10 | H | F | F |
| 11 | $CH_3$ | F | F |
| 12 | $C_2H_5$ | F | F |
| 13 | n-$C_4H_9$ | F | F |
| 14 | n-$C_5H_{11}$ | F | F |
| 15 | n-$C_6H_{13}$ | F | F |
| 16 | $CH_2$=CH | F | F |
| 17 | H | Cl | H |
| 18 | $CH_3$ | Cl | H |
| 19 | $C_2H_5$ | Cl | H |
| 20 | n-$C_3H_7$ | Cl | H |
| 21 | n-$C_4H_9$ | Cl | H |
| 22 | n-$C_5H_{11}$ | Cl | H |
| 23 | n-$C_6H_{13}$ | Cl | H |
| 24 | $CH_2$=CH | Cl | H |
| 25 | H | Cl | F |
| 26 | $CH_3$ | Cl | F |
| 27 | $C_2H_5$ | Cl | F |
| 28 | n-$C_3H_7$ | Cl | F |
| 29 | n-$C_4H_9$ | Cl | F |
| 30 | n-$C_5H_{11}$ | Cl | F |
| 31 | n-$C_6H_{13}$ | Cl | F |
| 32 | $CH_2$=CH | Cl | F |
| 33 | H | $CF_3$ | H |
| 34 | $CH_3$ | $CF_3$ | H |
| 35 | $C_2H_5$ | $CF_3$ | H |
| 36 | n-$C_3H_7$ | $CF_3$ | H |
| 37 | n-$C_4H_9$ | $CF_3$ | H |
| 38 | n-$C_5H_{11}$ | $CF_3$ | H |
| 39 | n-$C_6H_{13}$ | $CF_3$ | H |
| 40 | $CH_2$=CH | $CF_3$ | H |
| 41 | H | $CF_3$ | F |
| 42 | $CH_3$ | $CF_3$ | F |
| 43 | $C_2H_5$ | $CF_3$ | F |
| 44 | n-$C_3H_7$ | $CF_3$ | F |
| 45 | n-$C_4H_9$ | $CF_3$ | F |
| 46 | n-$C_5H_{11}$ | $CF_3$ | F |
| 47 | n-$C_6H_{13}$ | $CF_3$ | F |
| 48 | $CH_2$=CH | $CF_3$ | F |
| 49 | H | $OCF_3$ | H |
| 50 | $CH_3$ | $OCF_3$ | H |
| 51 | $C_2H_5$ | $OCF_3$ | H |
| 52 | n-$C_3H_7$ | $OCF_3$ | H |
| 53 | n-$C_4H_9$ | $OCF_3$ | H |
| 54 | n-$C_5H_{11}$ | $OCF_3$ | H |
| 55 | n-$C_6H_{13}$ | $OCF_3$ | H |
| 56 | $CH_2$=CH | $OCF_3$ | H |
| 57 | H | $OCF_3$ | F |
| 58 | $CH_3$ | $OCF_3$ | F |
| 59 | $C_2H_5$ | $OCF_3$ | F |
| 60 | n-$C_3H_7$ | $OCF_3$ | F |
| 61 | n-$C_4H_9$ | $OCF_3$ | F |
| 62 | n-$C_5H_{11}$ | $OCF_3$ | F |
| 63 | n-$C_6H_{13}$ | $OCF_3$ | F |
| 64 | $CH_2$=CH | $OCF_3$ | F |
| 65 | H | $OCHF_2$ | H |
| 66 | $CH_3$ | $OCHF_2$ | H |
| 67 | $C_2H_5$ | $OCHF_2$ | H |
| 68 | n-$C_3H_7$ | $OCHF_2$ | H |
| 69 | n-$C_4H_9$ | $OCHF_2$ | H |
| 70 | n-$C_5H_{11}$ | $OCHF_2$ | H |
| 71 | n-$C_6H_{13}$ | $OCHF_2$ | H |
| 72 | $CH_2$=CH | $OCHF_2$ | H |
| 73 | H | $OCHF_2$ | F |
| 74 | $CH_3$ | $OCHF_2$ | F |
| 75 | $C_2H_5$ | $OCHF_2$ | F |
| 76 | n-$C_3H_7$ | $OCHF_2$ | F |
| 77 | n-$C_4H_9$ | $OCHF_2$ | F |
| 78 | n-$C_5H_{11}$ | $OCHF_2$ | F |
| 79 | n-$C_6H_{13}$ | $OCHF_2$ | F |
| 80 | $CH_2$=CH | $OCHF_2$ | F |

EXAMPLE 81

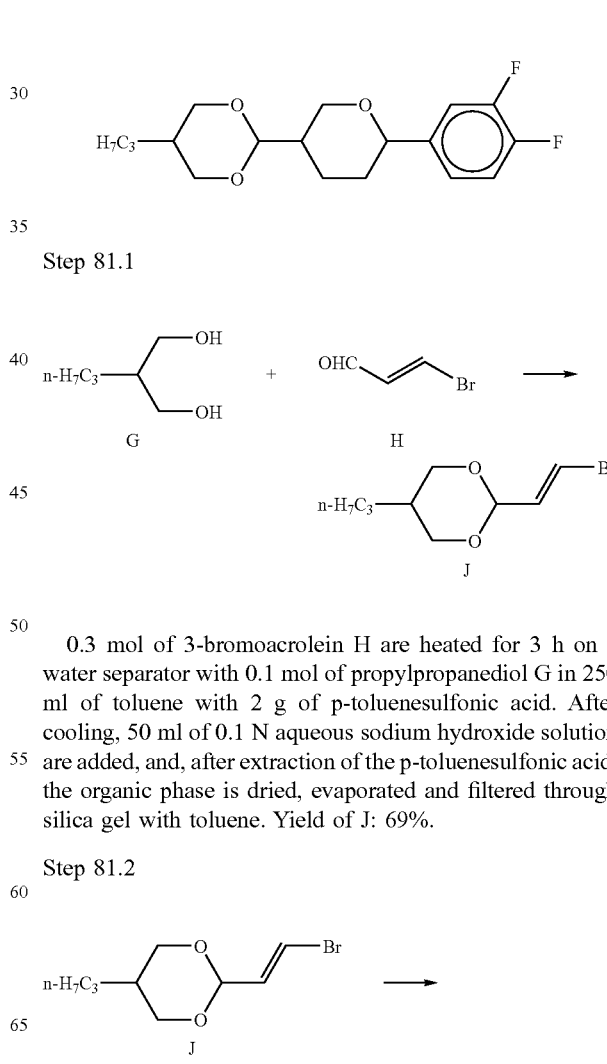

Step 81.1

0.3 mol of 3-bromoacrolein H are heated for 3 h on a water separator with 0.1 mol of propylpropanediol G in 250 ml of toluene with 2 g of p-toluenesulfonic acid. After cooling, 50 ml of 0.1 N aqueous sodium hydroxide solution are added, and, after extraction of the p-toluenesulfonic acid, the organic phase is dried, evaporated and filtered through silica gel with toluene. Yield of J: 69%.

Step 81.2

-continued

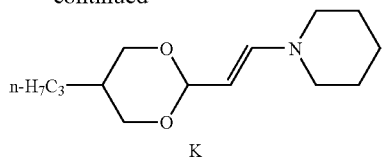
K 69 mmol of the bromovinyldioxane J are stirred for one hour at room temperature with 72.5 mmol of piperidine, 103.5 mmol of sodium tert-butoxide and 0.35 mmol of [PdBr(P-tert-butyl$_3$)]$_2$ in 70 ml of THF. The mixture is then stirred for about 5 minutes with 10 g of basic aluminium oxide and filtered. The residue (14.8 g) of the enamine K formed is processed further directly. The enamine is prepared analogously to the known method of J. D. Stambuli et al., Angewandte Chemie 114 (2002) 4940.

Step 81.3

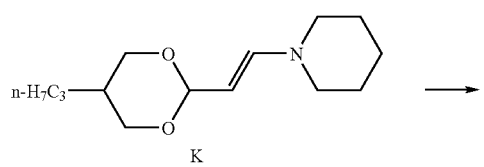
K

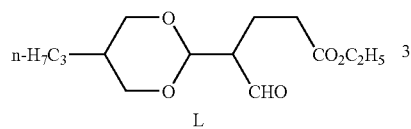
L 77.5 mmol of ethyl acrylate in 16 ml of acetonitrile are added to 62 mmol of the enamine K in 50 ml of acetonitrile at 5° C. under a nitrogen atmosphere, the mixture is stirred at this temperature for 5 h and subsequently heated to the boil. After the reaction mixture has been refluxed for 36 hours, 60 mmol of acetic acid in 24 ml of water are added at 50° C., and the mixture is held at this temperature for 3 h. Yield of the aldehyde L: 60%. The reaction is carried out analogously to the process of G. Stork, J. Am. Chem. Soc. 85 (1963) 207.

Step 81.4

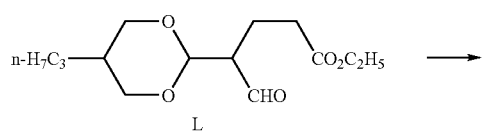
L

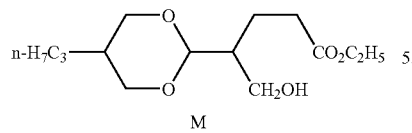
M 37 mmol of the aldehyde ester L are heated under reflux for 16 h with 19 mmol of sodium borohydride in 60 ml of isopropyl alcohol. The mixture is then substantially evaporated to dryness under reduced pressure, the residue is covered with methyl tert-butyl ether and digested with 1 N HCl. After evaporation, the organic phase gives the δ-hydroxy ester M (10.3 g), which is employed directly in the next reaction step without further purification.

Step 81.5

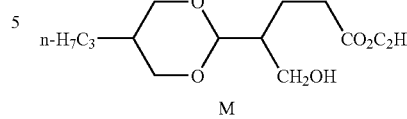
M

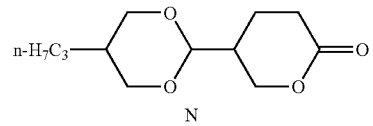
N 10.3 g of the crude δ-hydroxy ester M are dissolved in 200 ml of toluene and distilled with 500 mg of p-toluenesulfonic acid in a falling condenser with addition of fresh toluene until the boiling point of pure toluene has been reached. The toluenesulfonic acid is then extracted with aqueous soda solution, and the toluene phase is evaporated after drying. The residue is filtered through silica gel. Yield: 48% of the lactone N.

Step 81.6

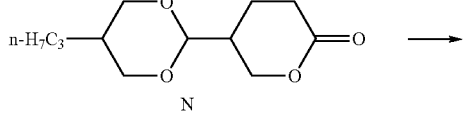
N

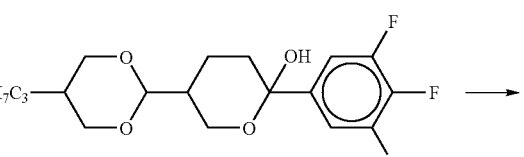
O

A solution of 3.8 g of 3,4,5-trifluorobromobenzene in 20 ml of THF is added dropwise at the boil to 18 mmol of magnesium turnings in 5 ml of THF. When the magnesium has dissolved, 4.1 g of the lactone N are added to the resultant Grignard solution, and the mixture is subsequently refluxed for 1 h. After conventional work-up using saturated ammonium chloride solution, the lactol O is filtered through silica gel. Yield: 82%.

Step 81.7

-continued

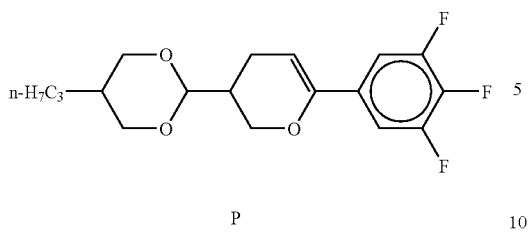

P 5.05 g of the lactol O are warmed on a water separator together with 2 g of propylpropanediol in the presence of 200 mg of p-toluenesulfonic acid until the elimination of water is complete. Extraction of the toluenesulfonic acid and filtration through silica gel gives the olefin P. Yield: 74%.

Step 81.8

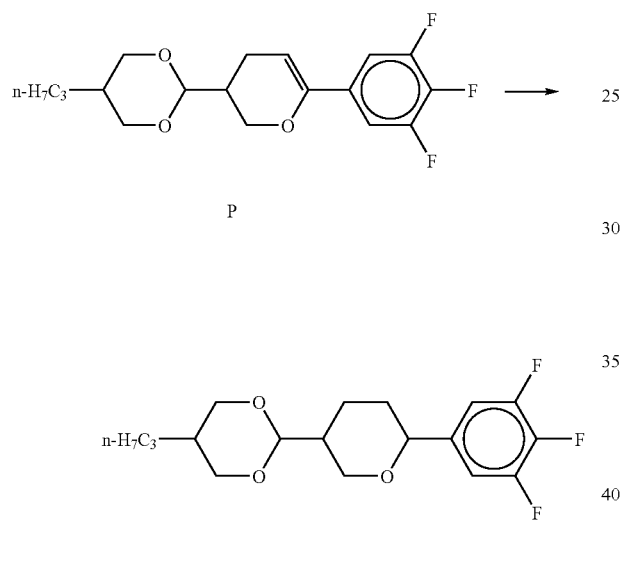

12 mmol of the olefin P are hydrogenated at 2 bar and room temperature in 100 ml of heptane with 600 mg of 5% Pd/C until the uptake of hydrogen is complete. After the catalyst has been filtered off, the evaporation residue (3.7 g) is taken up in toluene and filtered through silica gel to give the cis/trans isomer mixture of example compound 81. The evaporation residue can alternatively also be sent directly to isomerisation: 11 mmol of the cis/trans isomer mixture of the example compound are stirred at 0° C. for 4 h with 2 mmol of potassium tert-butoxide in 15 ml of N-methylpyr- rolidone. The reaction mixture is then poured into 100 ml of ice-water and extracted with heptane. The evaporation resi- due of the heptane phase is filtered through silica gel with toluene. The residue remaining after evaporation of the filtrate is recrystallised from heptane and gives example compound 81 as pure trans isomer. Yield: 69%.

Parameters*: $\Delta\epsilon$: 23.7; $\Delta n$: 0.0550; $\gamma_1$: 164; cl.p.: 17.9° C.

*: Determination of the parameters using a solution of 10% by weight of the compound in the host ZLI-4792 (Merck KGaA, Darmstadt) followed by extrapolation.

Phase range: C 87 I
The following compounds of the formula

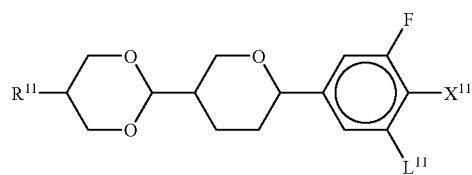

are prepared analogously to Example 81:

| Example | $R^{11}$ | $X^{11}$ | $L^{11}$ |
|---|---|---|---|
| 82 | H | F | H |
| 83 | $CH_3$ | F | H |
| 84 | $C_2H_5$ | F | H |
| 85 | $n-C_3H_7$ | F | H |
| 86 | $n-C_4H_9$ | F | H |
| 87 | $n-C_5H_{11}$ | F | H |
| 88 | $n-C_6H_{13}$ | F | H |
| 89 | $CH_2=CH$ | F | H |
| 90 | H | F | F |
| 91 | $CH_3$ | F | F |
| 92 | $C_2H_5$ | F | F |
| 93 | $n-C_4H_9$ | F | F |
| 94 | $n-C_5H_{11}$ | F | F |
| 95 | $n-C_6H_{13}$ | F | F |
| 96 | $CH_2=CH$ | F | F |
| 97 | H | Cl | H |
| 98 | $CH_3$ | Cl | H |
| 99 | $C_2H_5$ | Cl | H |
| 100 | $n-C_3H_7$ | Cl | H |
| 101 | $n-C_4H_9$ | Cl | H |
| 102 | $n-C_5H_{11}$ | Cl | H |
| 103 | $n-C_6H_{13}$ | Cl | H |
| 104 | $CH_2=CH$ | Cl | H |
| 105 | H | Cl | F |
| 106 | $CH_3$ | Cl | F |
| 107 | $C_2H_5$ | Cl | F |
| 108 | $n-C_3H_7$ | Cl | F |
| 109 | $n-C_4H_9$ | Cl | F |
| 110 | $n-C_5H_{11}$ | Cl | F |
| 111 | $n-C_6H_{13}$ | Cl | F |
| 112 | $CH_2=CH$ | Cl | F |
| 113 | H | $CF_3$ | H |
| 114 | $CH_3$ | $CF_3$ | H |
| 115 | $C_2H_5$ | $CF_3$ | H |
| 116 | $n-C_3H_7$ | $CF_3$ | H |
| 117 | $n-C_4H_9$ | $CF_3$ | H |
| 118 | $n-C_5H_{11}$ | $CF_3$ | H |
| 119 | $n-C_6H_{13}$ | $CF_3$ | H |
| 120 | $CH_2=CH$ | $CF_3$ | H |
| 121 | H | $CF_3$ | F |
| 122 | $CH_3$ | $CF_3$ | F |
| 123 | $C_2H_5$ | $CF_3$ | F |
| 124 | $n-C_3H_7$ | $CF_3$ | F |
| 125 | $n-C_4H_9$ | $CF_3$ | F |
| 126 | $n-C_5H_{11}$ | $CF_3$ | F |
| 127 | $n-C_6H_{13}$ | $CF_3$ | F |
| 128 | $CH_2=CH$ | $CF_3$ | F |
| 129 | H | $OCF_3$ | H |
| 130 | $CH_3$ | $OCF_3$ | H |
| 131 | $C_2H_5$ | $OCF_3$ | H |
| 132 | $n-C_3H_7$ | $OCF_3$ | H |
| 133 | $n-C_4H_9$ | $OCF_3$ | H |
| 134 | $n-C_5H_{11}$ | $OCF_3$ | H |
| 135 | $n-C_6H_{13}$ | $OCF_3$ | H |
| 136 | $CH_2=CH$ | $OCF_3$ | H |
| 137 | H | $OCF_3$ | F |
| 138 | $CH_3$ | $OCF_3$ | F |
| 139 | $C_2H_5$ | $OCF_3$ | F |
| 140 | $n-C_3H_7$ | $OCF_3$ | F |
| 141 | $n-C_4H_9$ | $OCF_3$ | F |

-continued

| Example | R¹¹ | X¹¹ | L¹¹ |
| --- | --- | --- | --- |
| 142 | n-C$_5$H$_{11}$ | OCF$_3$ | F |
| 143 | n-C$_6$H$_{13}$ | OCF$_3$ | F |
| 144 | CH$_2$=CH | OCF$_3$ | F |
| 145 | H | OCHF$_2$ | H |
| 146 | CH$_3$ | OCHF$_2$ | H |
| 147 | C$_2$H$_5$ | OCHF$_2$ | H |
| 148 | n-C$_3$H$_7$ | OCHF$_2$ | H |
| 149 | n-C$_4$H$_9$ | OCHF$_2$ | H |
| 150 | n-C$_5$H$_{11}$ | OCHF$_2$ | H |
| 151 | n-C$_6$H$_{13}$ | OCHF$_2$ | H |
| 152 | CH$_2$=CH | OCHF$_2$ | H |
| 153 | H | OCHF$_2$ | F |
| 154 | CH$_3$ | OCHF$_2$ | F |
| 155 | C$_2$H$_5$ | OCHF$_2$ | F |
| 156 | n-C$_3$H$_7$ | OCHF$_2$ | F |
| 157 | n-C$_4$H$_9$ | OCHF$_2$ | F |
| 158 | n-C$_5$H$_{11}$ | OCHF$_2$ | F |
| 159 | n-C$_6$H$_{13}$ | OCHF$_2$ | F |
| 160 | CH$_2$=CH | OCHF$_2$ | F |

EXAMPLE 161

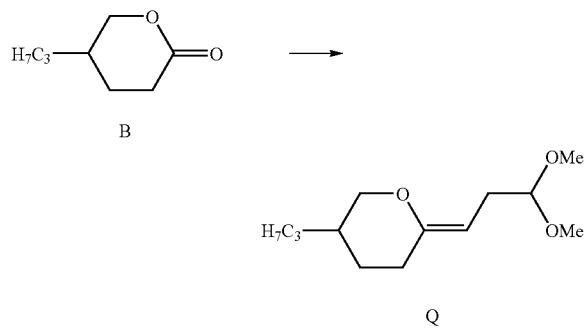

Step 161.1

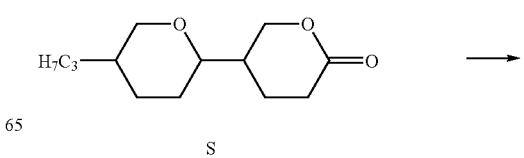

271 mmol of NaH are added in portions at 0° C. to a solution of 271 mmol of (CF$_3$CH$_2$O)$_2$OPCH$_2$CH(OMe)$_2$ in 800 ml of THF. When the evolution of gas is complete, 271 mmol of B are added. The mixture is then stirred at 35° C. for 18 h. The mixture is subjected to conventional aqueous work-up, and the crude product Q (colourless oil) is processed further directly. Yield: 78%.

Step 161.2

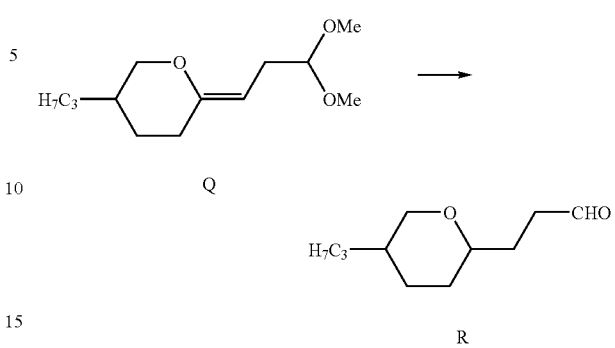

180 mmol of Q are dissolved in 500 ml of THF and hydrogenated in the presence of 3 g of 5% Pd/C until the uptake of hydrogen is complete. The mixture is filtered and evaporated in a rotary evaporator. The crude product is taken up in 500 ml of toluene and 500 ml of formic acid and stirred at room temperature for 18 h. This is then followed by conventional aqueous work-up. The crude product R is purified by vacuum distillation. Colourless oil. Yield: 67%.

Step 161.3

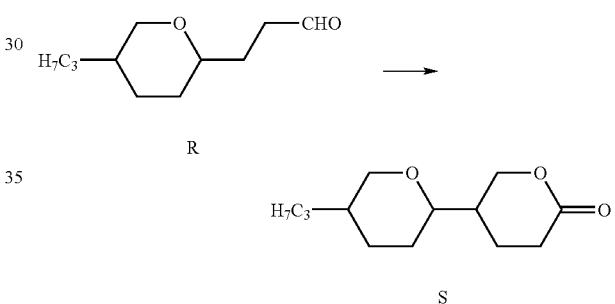

A mixture of 100 mmol of R, 130 mmol of methyl acrylate, 30 mmol of diethyltrimethylsilane and 300 ml of acetonitrile is heated at the boil for 18 h. The mixture is evaporated in a rotary evaporator, 10 ml of glacial acetic acid and 20 ml of water are then added, and the mixture is heated under reflux for 18 h. The mixture is subjected to conventional aqueous work-up, and the crude product is purified by chromatography. 50 mmol of NaBH$_4$ are added to a solution of the aldehyde in isopropanol at 0° C., and the mixture is stirred at room temperature for 18 h. The mixture is carefully acidified as usual using HCl and subjected to aqueous work-up. A solution of the crude alcohol in 500 ml of toluene is heated under reflux on a water separator with addition of 5 mmol of p-toluenesulfonic acid until methanol is no longer eliminated. The mixture is subjected to conventional aqueous work-up and purified by chromatography. Yellowish oil. Yield: 22%.

Step 161.3

-continued

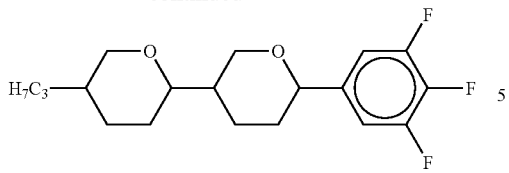

50 mmol of butyllithium (15% in hexane) are added dropwise at −50° C. to a solution of 50 mmol of 3,4,5-trifluorobromobenzene in 100 ml of diethyl ether. A solution of 45 mmol of S in 30 ml of diethyl ether is then added dropwise at this temperature, the mixture is stirred for a further 30 min, allowed to come to 0° C. and subjected to aqueous work-up. The crude product (51 g) is dissolved in 200 ml of $CH_2Cl_2$, and 150 mmol of triethyl silane are added at −75° C. 150 mmol of boron trifluoride etherate are added dropwise, during which the temperature must not rise above −70° C. The mixture is then allowed to come to −10° C., hydrolysed using sat. $NaHCO_3$ solution and subjected to conventional work-up. The product is chromatographed and recrystallised. Yield: 61%.

The following compounds of the formula

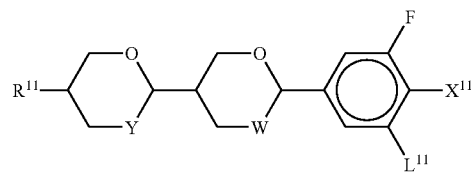

are prepared analogously to Example 161:

| Example | $R^{11}$ | $X^{11}$ | $L^{11}$ |
|---|---|---|---|
| 162 | H | F | H |
| 163 | $CH_3$ | F | H |
| 164 | $C_2H_5$ | F | H |
| 165 | n-$C_3H_7$ | F | H |
| 166 | n-$C_4H_9$ | F | H |
| 167 | n-$C_5H_{11}$ | F | H |
| 168 | n-$C_6H_{13}$ | F | H |
| 169 | $CH_2$=CH | F | H |
| 170 | H | F | F |
| 171 | $CH_3$ | F | F |
| 172 | $C_2H_5$ | F | F |
| 173 | n-$C_4H_9$ | F | F |
| 174 | n-$C_5H_{11}$ | F | F |
| 175 | n-$C_6H_{13}$ | F | F |
| 176 | $CH_2$=CH | F | F |
| 177 | H | Cl | H |
| 178 | $CH_3$ | Cl | H |
| 179 | $C_2H_5$ | Cl | H |
| 180 | n-$C_3H_7$ | Cl | H |
| 181 | n-$C_4H_9$ | Cl | H |
| 182 | n-$C_5H_{11}$ | Cl | H |
| 183 | n-$C_6H_{13}$ | Cl | H |
| 184 | $CH_2$=CH | Cl | H |
| 185 | H | Cl | F |
| 186 | $CH_3$ | Cl | F |
| 187 | $C_2H_5$ | Cl | F |
| 188 | n-$C_3H_7$ | Cl | F |
| 189 | n-$C_4H_9$ | Cl | F |
| 190 | n-$C_5H_{11}$ | Cl | F |
| 191 | n-$C_6H_{13}$ | Cl | F |
| 192 | $CH_2$=CH | Cl | F |
| 193 | H | $CF_3$ | H |
| 194 | $CH_3$ | $CF_3$ | H |
| 195 | $C_2H_5$ | $CF_3$ | H |
| 196 | n-$C_3H_7$ | $CF_3$ | H |
| 197 | n-$C_4H_9$ | $CF_3$ | H |
| 198 | n-$C_5H_{11}$ | $CF_3$ | H |
| 199 | n-$C_6H_{13}$ | $CF_3$ | H |
| 200 | $CH_2$=CH | $CF_3$ | H |
| 201 | H | $CF_3$ | F |
| 202 | $CH_3$ | $CF_3$ | F |
| 203 | $C_2H_5$ | $CF_3$ | F |
| 204 | n-$C_3H_7$ | $CF_3$ | F |
| 205 | n-$C_4H_9$ | $CF_3$ | F |
| 206 | n-$C_5H_{11}$ | $CF_3$ | F |
| 207 | n-$C_6H_{13}$ | $CF_3$ | F |
| 208 | $CH_2$=CH | $CF_3$ | F |
| 209 | H | $OCF_3$ | H |
| 210 | $CH_3$ | $OCF_3$ | H |
| 211 | $C_2H_5$ | $OCF_3$ | H |
| 212 | n-$C_3H_7$ | $OCF_3$ | H |
| 213 | n-$C_4H_9$ | $OCF_3$ | H |
| 214 | n-$C_5H_{11}$ | $OCF_3$ | H |
| 215 | n-$C_6H_{13}$ | $OCF_3$ | H |
| 216 | $CH_2$=CH | $OCF_3$ | H |
| 217 | H | $OCF_3$ | F |
| 218 | $CH_3$ | $OCF_3$ | F |
| 219 | $C_2H_5$ | $OCF_3$ | F |
| 220 | n-$C_3H_7$ | $OCF_3$ | F |
| 221 | n-$C_4H_9$ | $OCF_3$ | F |
| 222 | n-$C_5H_{11}$ | $OCF_3$ | F |
| 223 | n-$C_6H_{13}$ | $OCF_3$ | F |
| 224 | $CH_2$=CH | $OCF_3$ | F |
| 225 | H | $OCHF_2$ | H |
| 226 | $CH_3$ | $OCHF_2$ | H |
| 227 | $C_2H_5$ | $OCHF_2$ | H |
| 228 | n-$C_3H_7$ | $OCHF_2$ | H |
| 229 | n-$C_4H_9$ | $OCHF_2$ | H |
| 230 | n-$C_5H_{11}$ | $OCHF_2$ | H |
| 231 | n-$C_6H_{13}$ | $OCHF_2$ | H |
| 232 | $CH_2$=CH | $OCHF_2$ | H |
| 233 | H | $OCHF_2$ | F |
| 234 | $CH_3$ | $OCHF_2$ | F |
| 235 | $C_2H_5$ | $OCHF_2$ | F |
| 236 | n-$C_3H_7$ | $OCHF_2$ | F |
| 237 | n-$C_4H_9$ | $OCHF_2$ | F |
| 238 | n-$C_5H_{11}$ | $OCHF_2$ | F |
| 239 | n-$C_6H_{13}$ | $OCHF_2$ | F |
| 240 | $CH_2$=CH | $OCHF_2$ | F |

The invention claimed is:
1. A liquid crystalline compound of formula I:

in which $R^{11}$ denotes H, an alkyl or alkoxy radical having 1 to 15 carbon atoms, or alkenyl or alkenyloxy radical having 2 to 15 carbon atoms, wherein each of said radicals is unsubstituted or mono- or polysubstituted by halogen, where, in addition, one or more $CH_2$ groups in each of said radicals may each, independently of one another, be replaced by —C≡C—, —CH=CH—,

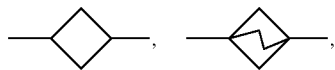

—O—, —CO—, —CO—O— or —O—CO— in such a way that O atoms are not linked directly to one another, X$^{11}$ denotes F, Cl, CN, NCS, SF$_5$, fluoroalkyl or fluoroalkoxy having 1 to 7 carbon atoms, or fluoroalkenyl or fluoroalkenyloxy having 2 to 7 carbon atoms;

L$^{11}$ denotes H or F, and

Y stands for O and W stands for CH$_2$, or Y stands for CH$_2$ and W stands for O, or Y and W both stand for CH$_2$.

2. A liquid crystalline compound according to claim 1, wherein L$^{11}$ denotes F.

3. A liquid crystalline compound according to claim 1, wherein R$^{11}$ denotes a straight-chain alkyl or alkenyl radical having up to 7 carbon atoms.

4. A liquid crystalline compound according to claim 1, wherein X$^{11}$ denotes F, Cl, SF$_5$, CN, OCF$_3$ or OCHF$_2$.

5. A liquid crystalline compound according to claim 1, wherein Y stands for O and W stands for CH$_2$.

6. A liquid crystalline compound according to claim 1, wherein Y stands for CH$_2$ and W stands for O.

7. A liquid crystalline compound according to claim 1, wherein Y and W both stand for CH$_2$.

8. A liquid crystalline compound according to claim 1, wherein said compound is selected from formulae I1 to I30:

I1
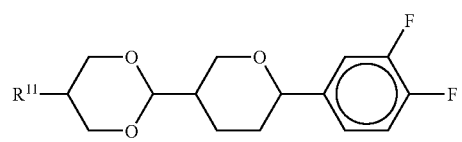

I2
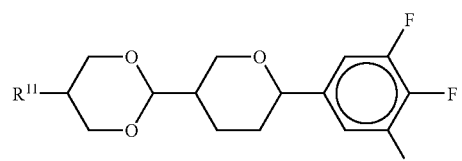

I3
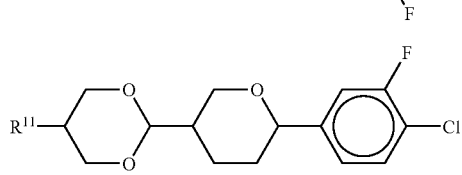

I4
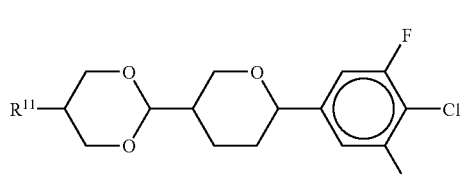

I5
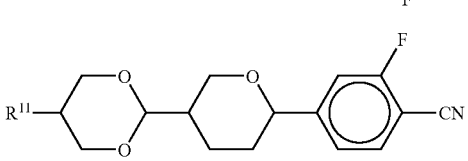

-continued

I6
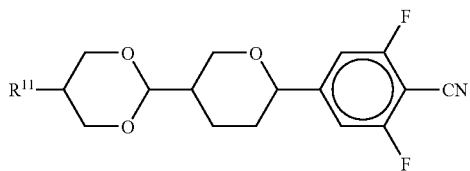

I7
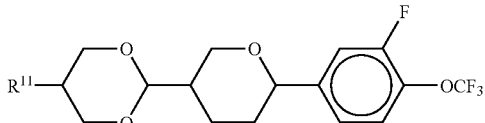

I8
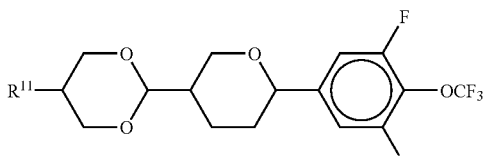

I9
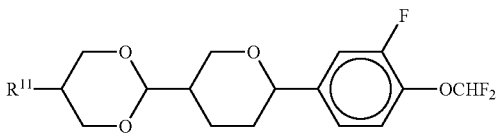

I10
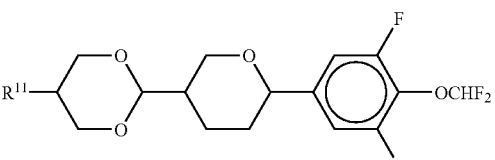

I11
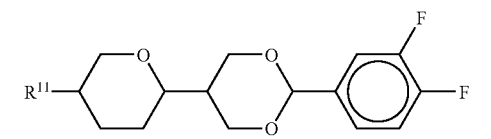

I12
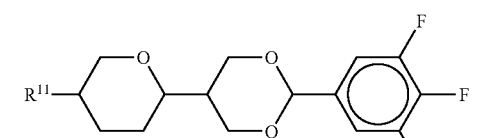

I13
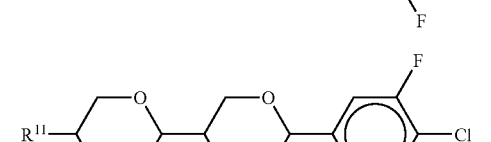

I14
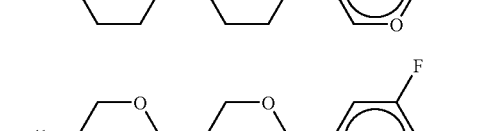

I15
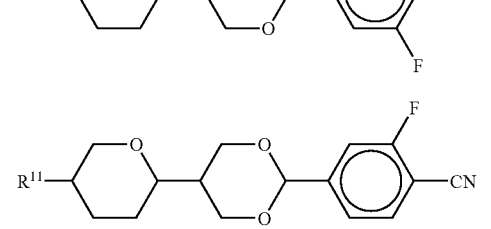

9. A liquid-crystalline medium comprising at least two liquid-crystalline compounds, wherein said medium comprises at least one compound according to claim 1.

10. A method of generating an electro-optical effect comprising applying a voltage to a liquid-crystalline medium contained in an electro-optical liquid-crystal display, wherein said medium is a liquid-crystalline medium according to claim 9.

11. An electro-optical liquid-crystal display comprising two plane-parallel outer plates, which, with a frame, form a cell, integrated non-linear elements for switching individual pixels on the outer plates, and a liquid-crystalline medium, wherein said medium is a liquid-crystalline medium according to claim 9.

12. A liquid crystalline compound according to claim 1, wherein $R^{11}$ is methyl, ethyl, n-propyl, n-butyl, n-pentyl, n-hexyl, n-heptyl, vinyl, 1E-propenyl, 2-propenyl, 1E-butenyl, 3-butenyl, 1E-pentenyl, 3E-pentenyl, 1E-hexenyl or 1E-heptenyl.

13. A liquid crystalline compound according to claim 1, wherein $X^{11}$ is F or $OCF_3$.

14. A liquid crystalline compound according to claim 1, wherein said compound is of Formula IA:

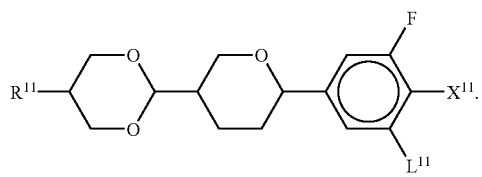

15. A liquid crystalline compound according to claim 1, wherein said compound is of Formula IB:

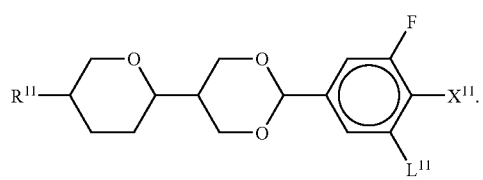

16. A liquid crystalline compound according to claim 1, wherein said compound is of Formula IC:

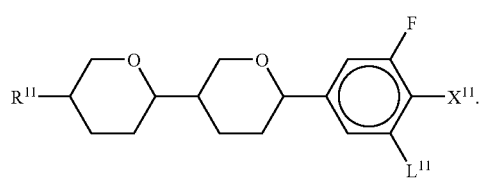

17. A liquid crystalline compound according to claim 14, wherein $R^{11}$ is a straight-chain alkyl or alkenyl radical having up to 7 carbon atoms, and $X^{11}$ is F, Cl, CN, $OCF_3$ or $OCHF_2$.

18. A liquid crystalline compound according to claim 15, wherein $R^{11}$ is a straight-chain alkyl or alkenyl radical having up to 7 carbon atoms, and $X^{11}$ is F, Cl, CN, $OCF_3$ or $OCHF_2$.

19. A liquid crystalline compound according to claim 16, wherein $R^{11}$ is a straight-chain alkyl or alkenyl radical having up to 7 carbon atoms, and $X^{11}$ is F, Cl, CN, $OCF_3$ or $OCHF_2$.

20. A liquid crystalline compound according to claim 8, wherein $R^{11}$ is methyl, ethyl, n-propyl, n-butyl, n-pentyl, n-hexyl, n-heptyl, vinyl, 1E-propenyl, 2-propenyl, 1E-butenyl, 3-butenyl, 1E-pentenyl, 3E-pentenyl, 1E-hexenyl or 1E-heptenyl.

21. A liquid crystalline compound according to claim 8, wherein said compound is of formulae I1, I2, I4, I6, I7, I8, I10, I12, I14, I16, I18, I20, I22, I24, I26, I28 and I30.

22. A liquid crystalline compound according to claim 8, wherein said compound is of formulae I1, I2, I8, I12, I18, I22 and I28.

* * * * *